United States Patent [19]

Fukuda et al.

[11] Patent Number: 4,679,935
[45] Date of Patent: Jul. 14, 1987

[54] LIGHT DISTRIBUTION OF HEADLIGHT BEAM

[75] Inventors: Yutaka Fukuda, Tokorozawa; Koji Minagawa, Chiba; Hiroichi Nabeshima, Hidakamachi; Koihiro Muneki, Hino; Yoshikatsu Asano, Shiki; Kazuo Aoki, Hachiohji; Yutaka Ishizaka, Shinmachi, all of Japan

[73] Assignee: Honda Giken Kogyo Kabushikikaisha, Tokyo, Japan

[21] Appl. No.: 664,828

[22] Filed: Oct. 25, 1984

[30] Foreign Application Priority Data

Oct. 28, 1983 [JP] Japan ................................ 58-201964
Jan. 27, 1984 [JP] Japan ................................ 59-11894
Aug. 30, 1984 [JP] Japan ................................ 59-179443

[51] Int. Cl.$^4$ ............................................. G01J 1/00
[52] U.S. Cl. ..................................... 356/121; 33/288; 33/335
[58] Field of Search ............... 356/121, 122; 33/180 L, 33/288; 358/96

[56] References Cited

U.S. PATENT DOCUMENTS 4,120,589 10/1978 Mima et al. .......................... 356/121

FOREIGN PATENT DOCUMENTS 32472 12/1969 Japan .................................... 356/121
48211 11/1982 Japan .................................... 356/121
24232 2/1984 Japan .................................... 356/121

OTHER PUBLICATIONS

Bruder, J. A. "Instrumentation for Mapping Light Intensity Contours", IEEE Transactions on Vehicular Technology, vol. VT-19, No. 3 (Aug. 1970).

Primary Examiner—R. A. Rosenberger
Attorney, Agent, or Firm—Alan H. MacPherson; Thomas S. MacDonald; Richard Franklin

[57] ABSTRACT

A method and apparatus for determining or adjusting a projecting direction of a light beam emitted from an automobile headlight is provided. In a first aspect of the present invention, the peripheral region of a light beam is used in determining its projecting direction. In particular, a region definable in a light pattern of the projected beam having a proportionality relation between log S and I, where S indicates the value of an area having light intensity I or above, is determined and its outer contour or any predetermined point in the contour is used in determining the projecting direction. In a second aspect, apparatus for determining a projecting direction of a light beam emitted from an automobile headlight includes an indicator which automatically indicates a predetermined position of a light pattern of the light beam projected. In a third aspect, there is provided a system for automatically adjusting a projecting direction of a light beam if it deviates from a predetermined direction using a motor engageable with a mounting structure of the headlight.

15 Claims, 33 Drawing Figures

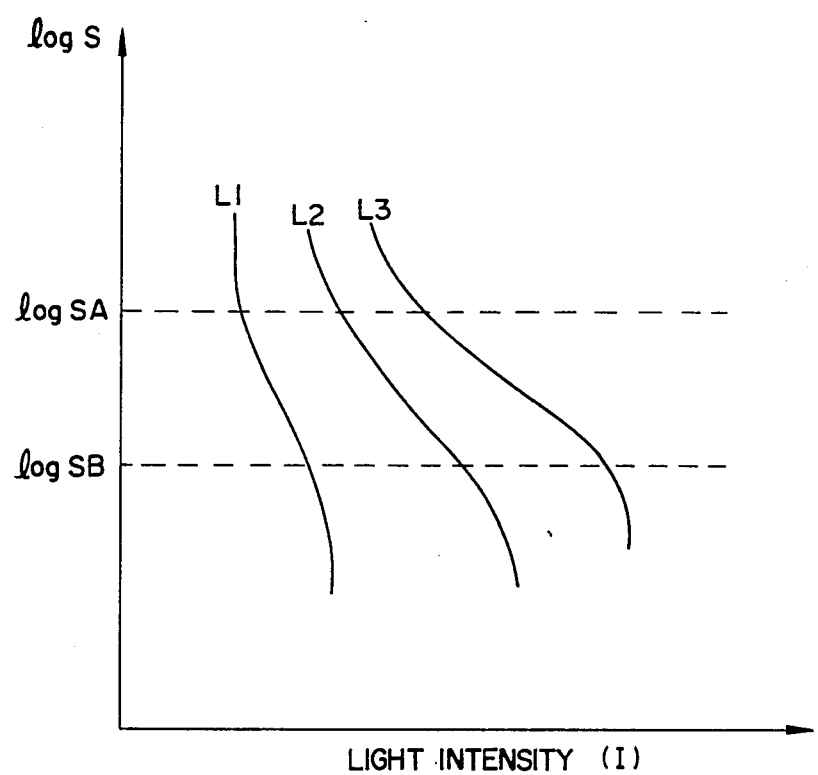

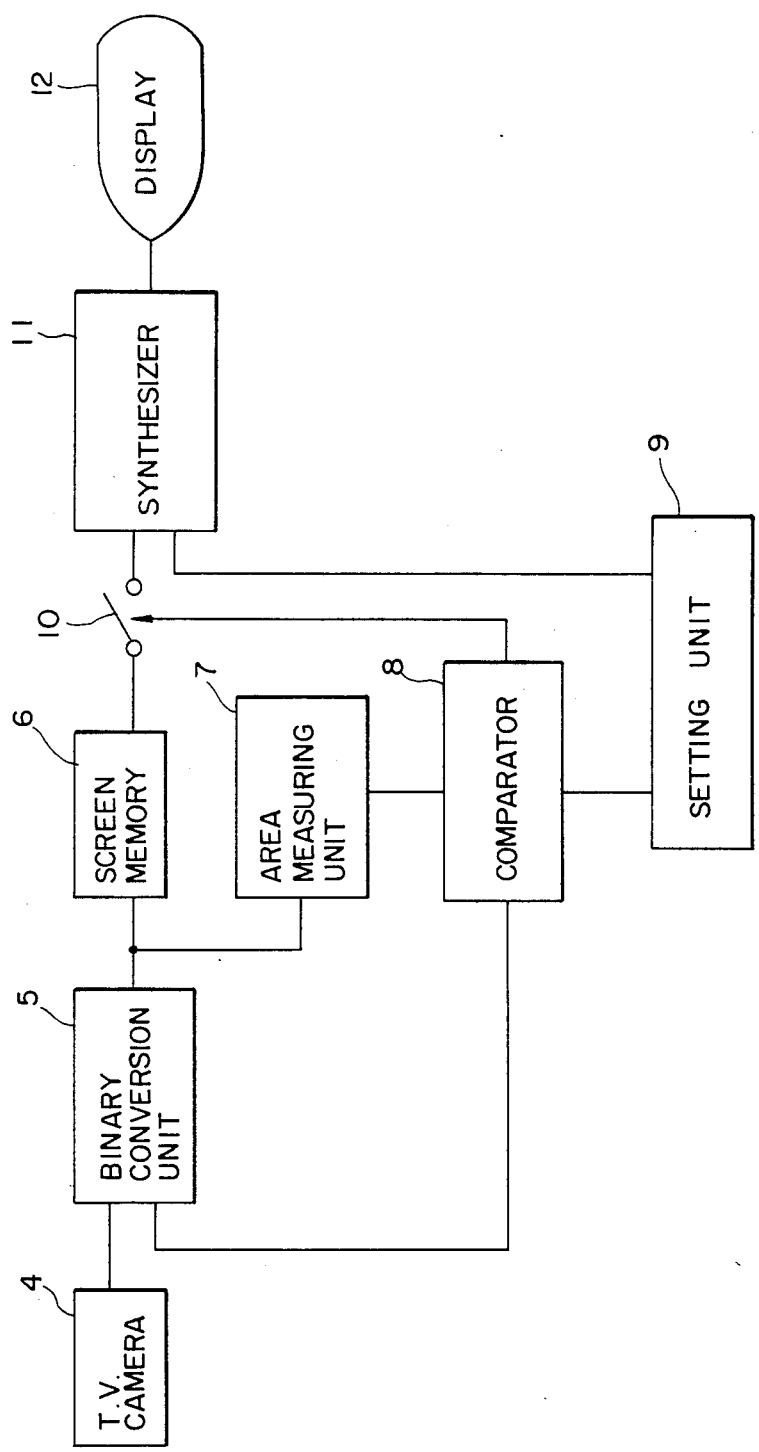

Fig. IIa 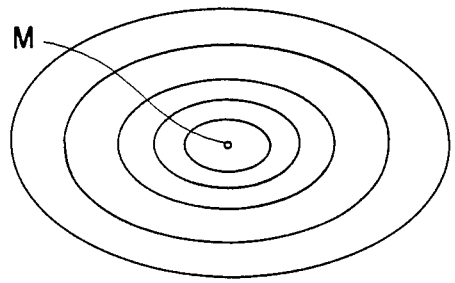 Fig. IIb 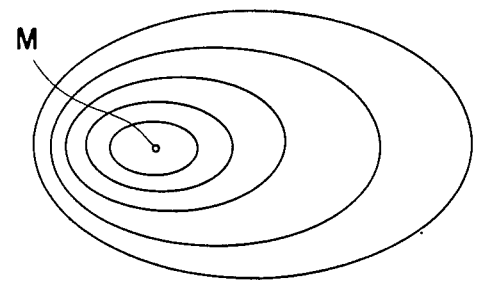
Fig. IIc
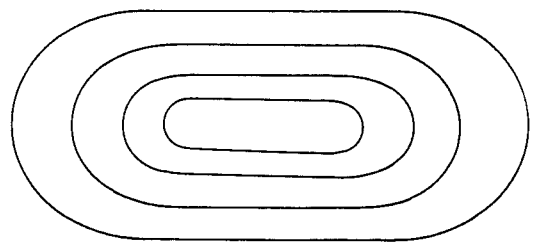
Fig. IId
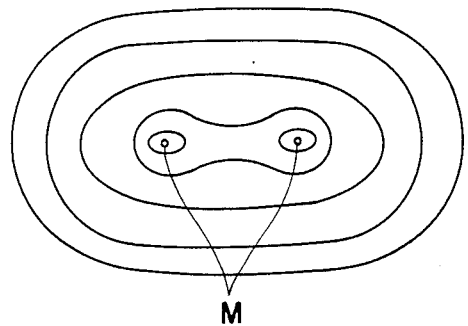

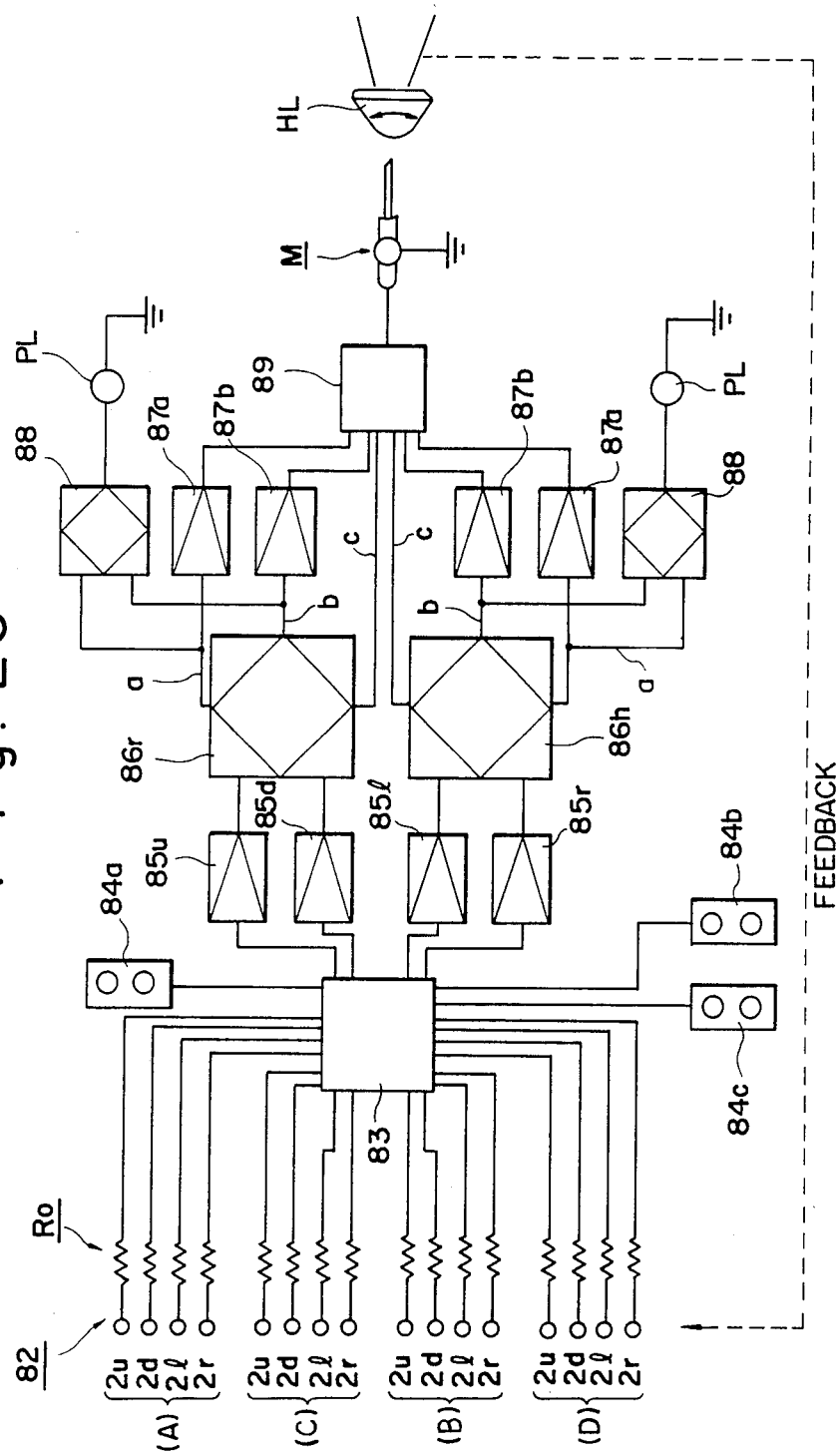

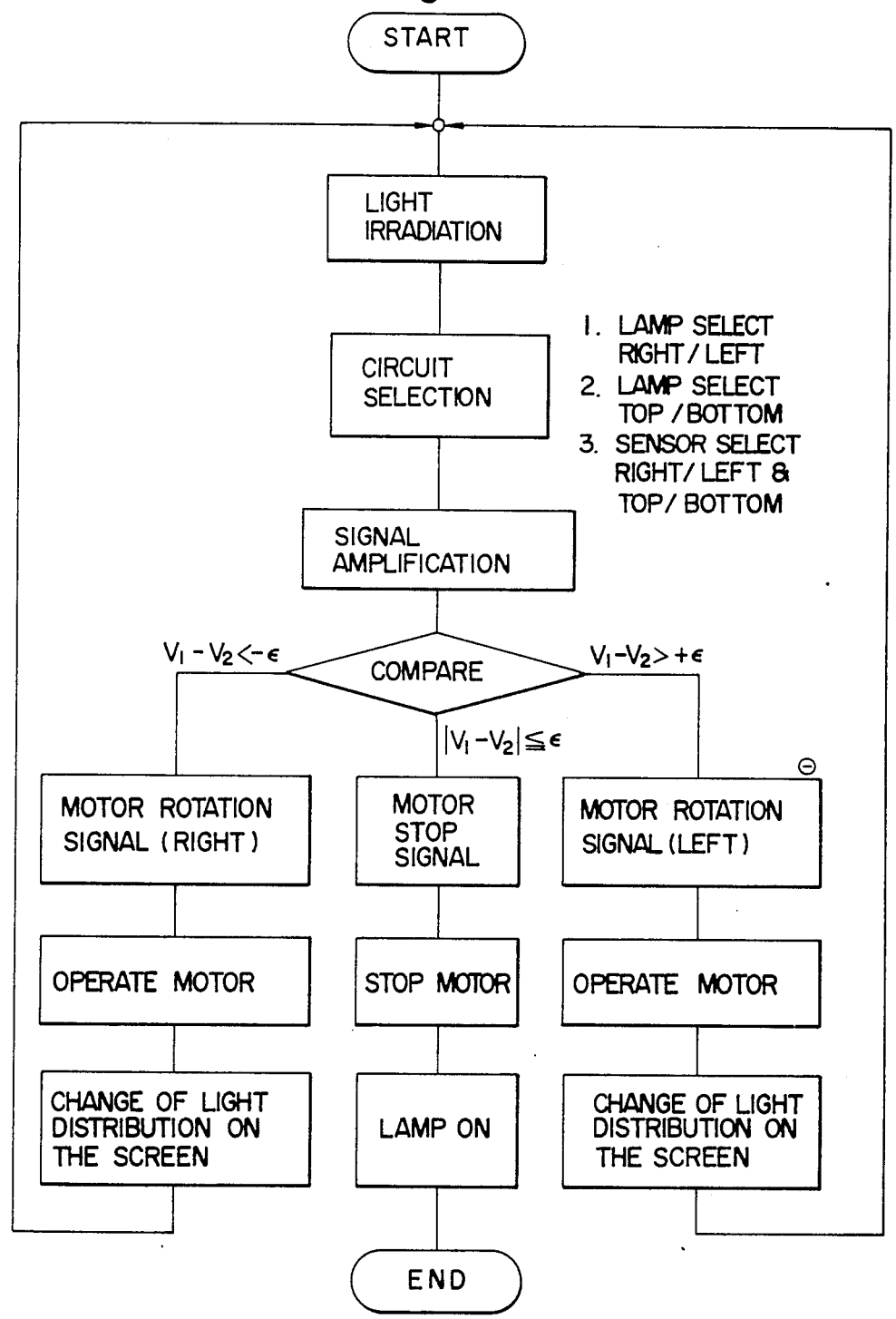

LIGHT DISTRIBUTION OF HEADLIGHT BEAM

BACKGROUND OF THE INVENTION

1. Field of the Invention

This invention generally relates to a method and apparatus for determining the distribution of light or the direction of a light beam irradiated from a lamp, and, in particular, to a method and apparatus for determining the light distribution or irradiation direction of a light beam emitted from a headlight of an automobile or the like.

2. Description of the Prior Art

In determining the irradiation distribution of a light beam emitted from an automobile headlight, it is common practice to have the light beam directed toward a screen which is placed in front of the headlight approximately 3 meters away and to look for a maximum light intensity point visually. Alternatively, a pair of photoelectric sensors are provided on the screen so as to be movable in the vertical direction and another pair of photoelectric sensors are also provided on the screen so as to be movable in the horizontal direction, wherein the sensors are located such that the outputs from the paired sensors are balanced thereby determining a light axis of the beam. Then, the mounting condition of headlight is adjusted such that the thus determined light axis corresponds to an intended irradiation direction.

However, these prior art approaches suffer from various disadvantages because the light intensity distribution of a light beam from an automobile headlight could be quite irregular thereby making it difficult to definitely determine the maximum light intensity point and equi-irradiation curves are often times distributed not in a concentric manner, whereby the maximum light intensity point is located eccentrically or there exists more than one. Thus, there has been a need to develop an improved method and apparatus for determining more accurately the distribution of irradiation or irradiation direction of a light beam emitted from an automobile headlight.

SUMMARY OF THE INVENTION

It is therefore a primary object of the present invention to obviate the disadvantages of the prior art as described above and to provide an improved method and apparatus for determining the irradiation distribution of a light beam emitted from a lamp, such as an automobile headlight.

Another object of the present invention is to provide an improved method and apparatus for determining the irradiation direction of a light beam emitted from an automobile headlight at high accuracy.

A further object of the present invention is to provide an improved method and apparatus for determining the irradiation distribution of a light beam irradiated from an automobile headlight more accurately.

A still further object of the present invention is to provide an improved method and apparatus for adjusting a mounting condition of an automobile headlight such that its light beam is directed in an intended direction.

Other objects, advantages and novel features of the present invention will become apparent from the following detailed description of the invention when considered in conjunction with the accompanying drawings.

BRIEF DESCRIPTION OF THE DRAWINGS

FIG. 3 is a graph showing several irradiation distribution characteristics of different headlights;

FIG. 4 is a block diagram showing a system for determining the irradiation distribution of a light beam emitted from a light source constructed in accordance with one embodiment of the present invention;

FIGS. 11a-11d are schematic illustrations showing several typical irradiation distributions which are obtained when a light beam is irradiated from an automobile headlight;

FIG. 20 is a block diagram showing a system for adjusting the direction of a light beam emitted from an automobile headlight by processing the irradiation distribution obtained from the screen shown in FIG. 19;

FIG. 21 is a flow chart which is useful for explaining the operation of the system shown in FIG. 20.

DESCRIPTION OF THE PREFERRED EMBODIMENTS

In accordance with one aspect of the present invention, there is provided a method and apparatus capable of determining the irradiation distribution or irradiation direction of a light beam emitted from an automobile headlight at an increased accuracy. The method and apparatus of this aspect of the present invention have been developed based on the following findings. That is, the present inventors have found that in a cross-sectional area of a light beam emitted from a light source, such as an automobile headlight, there is a region where a proportionality relation is present between log S and I with "S" indicating an area which has a light intensity or irradiation level "I" equal to or above a predetermined level. It has also been found that this region has common upper and lower area limits for different kinds of lamps to be used as automobile headlights. Furthermore, it has also been found that there is a correspondence between the region where a proportionality relation holds between log S and I and a region of a light beam called beam periphery, which will be described in detail later.

Based on the above-described findings, in accordance with the principle of one embodiment of the present invention, a desired area value is first set to be within a range where a proportionality relation holds between log S and I, and, then, a region is determined in the cross-section of a light beam irradiated on a screen so as to satisfy the set area value. A configuration or outer contour of this region or a point within the region is used to determine the irradiation distribution.

Figure 1:
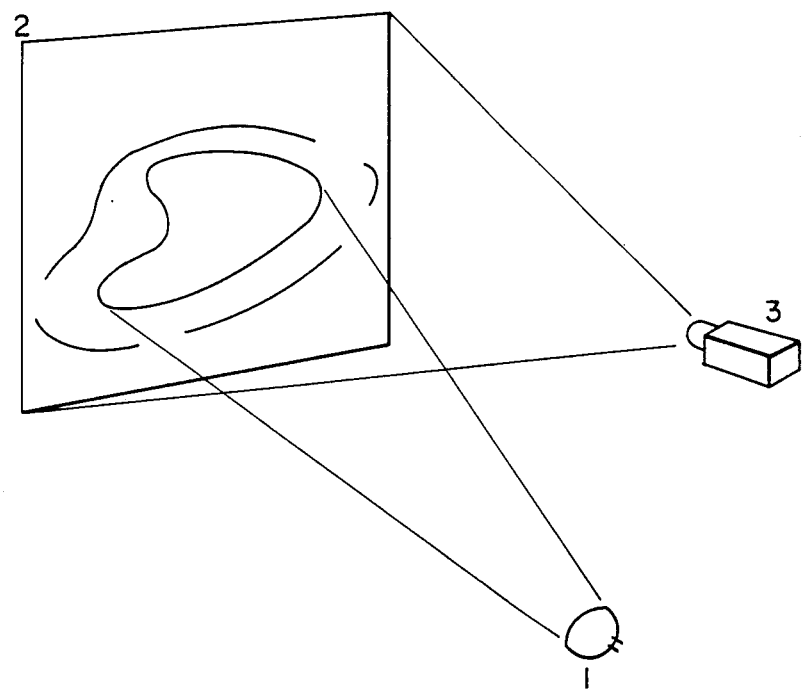
FIG. 1 is a schematic illustration showing a method of examining an irradiation distribution of a light beam emitted from a light source in accordance with one embodiment of the present invention.
Figure 2A:
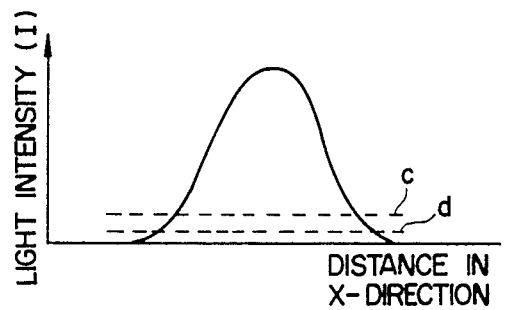
FIGS. 2a-2c are graphs useful for explaining a beam periphery which is to be used in determining the irradiation distribution accurately in accordance with the principle of the present invention.
Figure 2B:
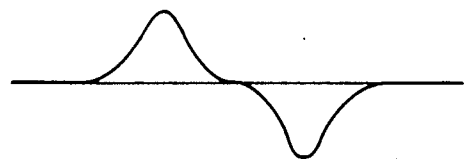
Figure 2C:
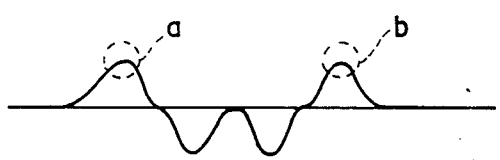

Now, referring to FIG. 1, a light beam emitted from an automobile headlight 1 is projected to a screen 2, and a reflecting light beam from the screen 2 enters a T.V. camera 3 thereby measuring the light intensity of the light beam projected onto the screen 2 at each point. With reference to FIGS. 2a–2c, the so-called "beam periphery", as used here, of the light beam projected to the screen 2 as emitted from the headlight 1 will be described. FIG. 2a is a graph showing a light intensity distribution of the light beam on the screen along a distance X, e.g., horizontal distance, so that its abscissa represents a distance in the X-direction and its ordinate represents light intensity I. FIG. 2b shows a curve which is obtained by taking a derivative of the light intensity curve plotted in the graph of FIG. 2a with respect to distance X. Furthermore, FIG. 2c shows a curve which is obtained by taking a second derivative of the light intensity curve with respect to distance X. The "beam periphery" is defined as a region including the maximum of the second derivative of light intensity with respect to distance X and its vicinity. Therefore, the beam periphery of the illustrated example may be indicated by those portions indicated by dotted circles a and b in FIG. 2c. It is to be noted that the beam periphery is a region defining a closed loop having a particular configuration and extending in the form of a belt.

Using the system of FIG. 1, different kinds of headlights L1–L3 have been examined and their light irradiation distributions have been measured. FIG. 3 shows a graph in which measured characteristic curves for three different kinds of lamps L1–L3 are plotted, in which the abscissa represents light intensity I and the ordinate represents the logarithm of the area value S of a region in the cross-section of a light beam on the screen having a light intensity which is equal to or larger than a predetermined level. As may be easily seen from the graph of FIG. 3, irrespective of the kinds of lamps used, there is a region where a proportionality relation holds between log S and I for each of the curves L1–L3, and these regions have a common upper limit log $S_A$ and a common lower limit log $S_B$. Interestingly enough, the light intensity I in this range between log $S_A$ and log $S_B$ corresponds to the light intensity I in the range indicated between the dotted lines c and d in the graph of FIG. 2a. In other words, the light intensity determined by any of the curves L1–L3 at log $S_A$ corresponds to the light intensity line d and that determined by log $S_B$ corresponds to the light intensity line c. It is thus clear that the linear region of the log S - I curve corresponds to the "beam periphery" region of a light beam.

As described above, that portion of a cross-section of a light beam which satisfies a proportionality relation between log S and I corresponds to the so-called beam periphery region, where the slope of a curve indicating the rate of change of light intensity with respect to distance is rather steep and thus it is believed to be more influential to human eyes. It may be said that the beam periphery region is a region having a relatively high positive acceleration because the beam periphery region is defined as having the maximum of the second derivative of light intensity with respect to distance as compared to acceleration which is obtained by taking a second derivative of a distance with respect to time. It has been found empirically that the beam periphery region is recognized more as a region defined by the upper limit log $S_A$ when observed with human eyes wide open; on the other hand, it tends to be recognized more as a region defined by the lower limit log $S_B$ when observed with human eyes half closed.

In this manner, since there is a particular relation between light intensity I and area value in the beam periphery region, in accordance with the principle of this aspect of the present invention, a selected area value is set corresponding to this beam periphery region and then a region is determined in the cross-section of a light beam projected on a screen so as to agree with the selected area value and to have a light intensity equal to or larger than a predetermined level, thereby determining a beam periphery of the projected light beam, which is then used to determine the irradiation distribution or irradiation direction of the projected light beam.

FIG. 4 shows in block form a system for determining an irradiation distribution or irradiation direction of a light beam emitted from a headlight constructed in accordance with one embodiment of the present invention. As shown, the system includes a T.V. camera 4 for receiving light reflecting from a screen on which a light beam from a headlight to be examined is projected, a binary conversion unit 5 for receiving a signal from the T.V. camera 4 to convert the signal into the form of a binary number by thresholding, a screen memory 6 for storing the binary data produced by the binary conversion unit 5, an area measuring unit 7 for calculating the area having a light intensity equal to or larger than a predetermined level based on the data produced by the binary conversion unit 5, a comparator 8 for comparing the calculated area value with a preset value, a setting unit 9 for setting the preset value to be compared, a switch 10, a synthesizer for combining image data to be displayed and a display unit 12, such as a CRT display device.

With such a structure, the T.V. camera 4 receives information from the screen 2 to which a light beam is projected from a headlight to be examined, as shown in FIG. 2, and an image signal of the irradiation distribution on the screen 2 obtained by the T.V. camera 4 is supplied to the binary conversion unit 5, where the image signal is subjected to a thresholding operation as being compared with a threshold level thereby being converted into binary data. The threshold level may be increased or decreased depending on instructions supplied from the comparator 8. The binary data produced by the binary conversion unit 5 are stored in the screen memory 6 for one frame, and, at the same time, the data are also supplied to the area measuring unit 7 so as to calculate the number of picture elements having light intensity levels equal to or larger than the light intensity level corresponding to the threshold level. The calculated value at the area measuring unit 7 is compared with a preset value from the setting unit 9 at the comparator 8.

The setting unit 9 contains previously stored area values for different kinds of headlights, and it supplies an area value as selected by an external operation as a preset value to the comparator 8. At the comparator 8, the calculated value from the area measuring unit 7 is compared with the preset or selected value from the setting unit 9, and if the calculated value is found to be smaller, then the comparator 8 supplies an instruction to the binary conversion unit 5 to increase the threshold level by a predetermined amount; on the other hand, if the calculated value is found to be larger, then the comparator 8 supplies an instruction to the binary conversion unit 5 to decrease the threshold level. Such a process is repeated until the calculated value becomes equal to the selected or preset value from the setting unit 9. Thus, the threshold level under the condition corresponds in value to the light intensity of "beam periphery" thereby allowing determination of the contour of "beam periphery".

Then, the comparator 8 supplies an instruction to the switch 10 to have it closed thereby allowing the data stored in the screen memory 6 to be supplied to the synthesizer 11, where the data from the screen memory 6 are superimposed with reference marks, such as reference lines and points, supplied from the setting unit 9. The thus combined data are then supplied to the display unit 12 to be displayed on its screen for visual observation by an operator. It is to be noted that the setting unit 9 contains not only various area values for different kinds of headlights as previously stored but also reference mark data for various kinds of headlights or car models to which the headlights are to be mounted. Thus, an appropriate reference mark as selected by an external operation may be displayed on the screen of display unit 12.

Figure 5A:
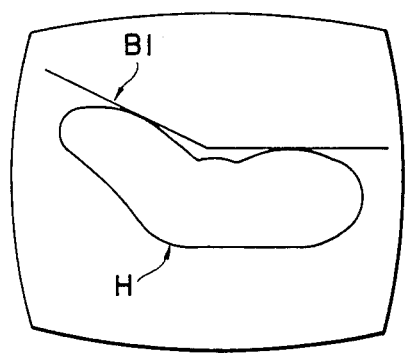
FIGS. 5a-5c are schematic illustrations showing several examples which may be displayed on the screen of a CRT display in the present system.
Figure 5B:
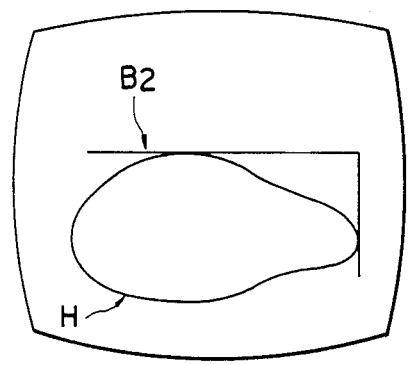
Figure 5C:
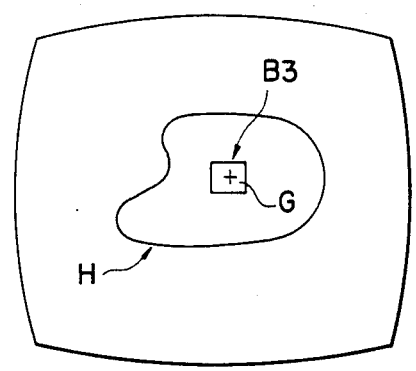

Some of the typical examples displayed by the display unit 12 are shown in FIGS. 5a-5c. FIG. 5a shows a case in which a beam periphery H is displayed with its top portion in contact with a reference mark B1 whose right half is comprised of a horizontal straight line and whose left half is comprised of an inclined straight line. If the beam periphery H is not in contact with the reference mark B1, a headlight under examination may be adjusted in orientation or its mounting condition to bring the beam periphery H in contact with the reference mark B1 as shown in FIG. 5a. FIG. 5b shows another example in which another beam periphery H is also in contact with another reference mark B2 which is comprised of a horizontal straight line and a vertical straight line. In this manner, the reference mark B may take any desired shape and it does not need to be limited only to the illustrated examples.

FIG. 5c shows a further example in which a reference mark B3 is displayed in the form of a small square and the orientation of a headlight under examination may be adjusted by moving the headlight so as to locate a center of gravity G of beam periphery H inside of the small square reference mark B3. In this case, the position of center of gravity G must first be calculated so as to be displayed on the screen of display unit 12, for example, as a mark "+". One method of calculating the position of center of gravity G is based on the assumption that material particles of the same mass are uniformly distributed across the area circumscribed by the beam periphery, and there is another method which is based on the assumption that material particles, each having a mass corresponding to the light intensity of the corresponding position, are distributed. In the former case, the center of gravity G can be obtained by calculating an average point of coordinate positions in one direction, e.g., horizontal direction, and an average point of coordinate positions in the other direction, e.g., vertical direction, which is normal to the one direction. On the other hand, in the latter case, masses for respective points in the area circumscribed by the beam periphery are also stored and the mass is multiplied by the corresponding coordinate when calculating a total in one direction. Such calculations may be easily carried out by an appropriate arithmetic unit (not shown) using the data stored in the screen memory 6.

Figure 6:
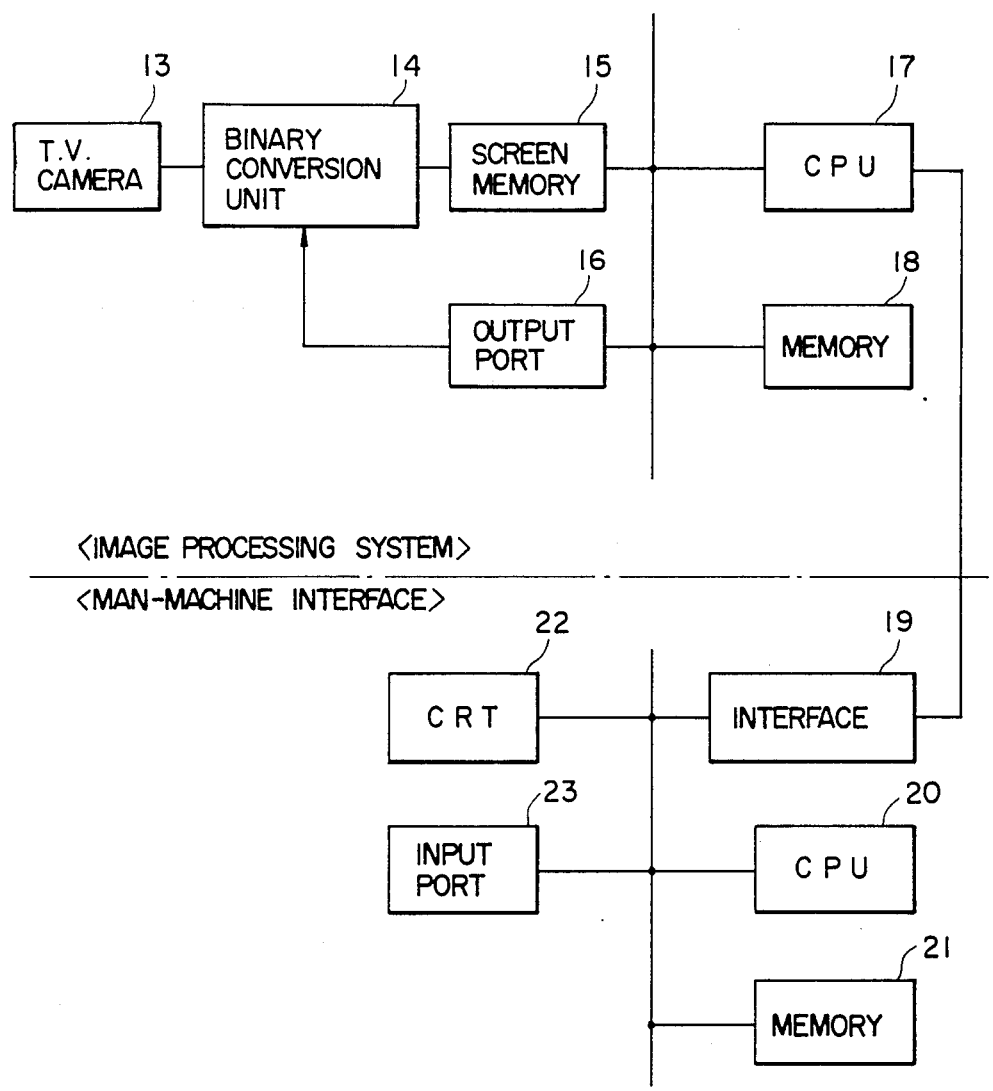
FIG. 6 is a block diagram showing a system for determining the irradiation distribution of a light beam emitted from a light source constructed in accordance with another embodiment of the present invention.

FIG. 6 shows another system constructed as embodying the present invention. The system of FIG. 6 includes a T.V. camera 13, binary conversion unit 14, screen memory 15, an output port 16, central processing unit (CPU) 17 and memory 18, which in combination defines an image processing system for processing the data obtained from image information on the screen to which a light beam is projected from a headlight under examination. The system of FIG. 6 also includes an interface 19, CPU 20, memory 21, a CRT display device 22 and an input port 23, which in combination define a man-machine interface.

With the above-described structure, various input data, such as car model data, reference mark data and area value data, are initially fed into the system through the input port 23, and, then, under the control of CPU 20, these reference mark data and area value data are stored into the memory 21 as classified according to various car models and/or kinds of headlights in these car models. Thereafter, when the model data of a car to be examined is fed through the input port 23, the reference and area value data corresponding to the car model are automatically read out of the memory 21, and the reference data thus read out are supplied to the CRT display device 22 where the reference mark, such as those B1 - B3 illustrated in FIGS. 5a-5c, respectively, is displayed on the screen. On the other hand, the area value data are stored into the other memory 18 via the interface 19 and CPU 17.

In the image processing system, the T.V. camera 3 converts the light image information on the screen 2 of FIG. 1 into an electrical image signal, which is then supplied to the binary conversion unit 14, where the analog image signal from the T.V. camera 13 is subjected to a thresholding operation using a threshold level of a desired light intensity level, and the thus produced binary data is stored into the image or screen memory 15. Similarly with the previous case, the threshold level at the binary conversion unit 14 is appropriately adjusted in accordance with an instruction supplied from the output port 16. That is, the threshold level is adjusted under the control of CPU 17 until the area having a light intensity which is equal to or larger than the light intensity corresponding to the threshold level agrees in value within a predetermined allowable error range to the area data supplied from the man-machine interface. When such an agreement is obtained, the beam periphery of a light beam under examination is determined and this information is then supplied to the man-machine interface.

Figure 7:
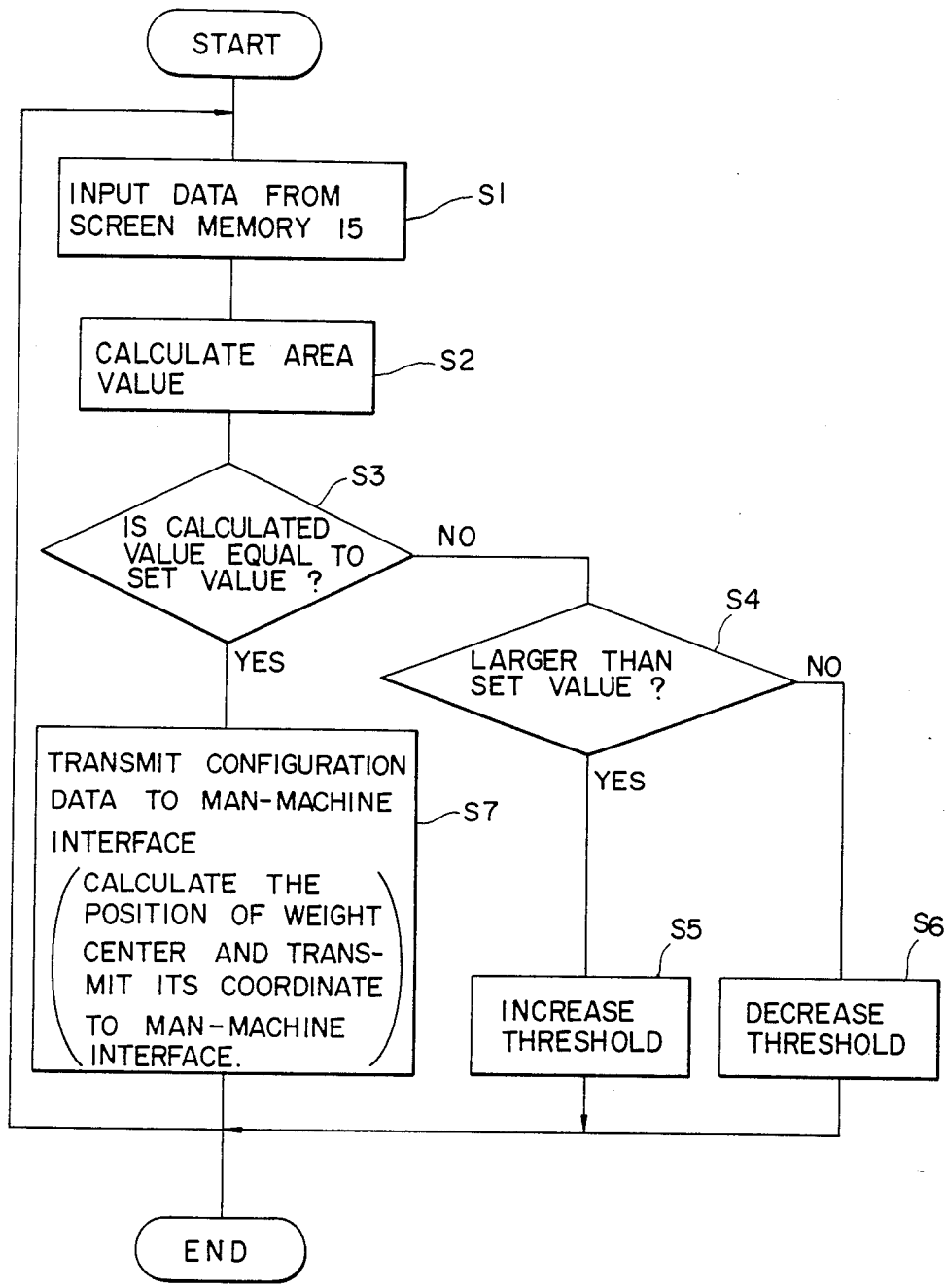
FIG. 7 is a flow chart showing a sequence of steps for determining the configuration of a beam periphery of a light beam emitted from a light source in accordance with one embodiment of the present invention.

The above-described operation will be understood more clearly when reference is made to the flow chart shown in FIG. 7. As shown, CPU 17 receives the image data from screen memory 15 (step S1) and calculates the area value by counting the number of picture elements having high level or "1" (step S2). Then, the area value thus calculated is compared with the preset area value supplied from the man-machine interface (step S3), and if there is no agreement between the two, it is checked as to whether the calculated area value is larger than the preset area value (step S4). If the calculated area value has been found to be larger, an instruction for increasing the light intensity threshold level by a predetermined amount is supplied to the binary conversion unit 14 via the output port 16 since the light intensity threshold level used has been too low (step S5). On the contrary, if the calculated area value has been found to be smaller, an instruction for decreasing the light intensity threshold level by a predetermined amount is supplied to the binary conversion unit 14 via the output port 16 since the light intensity threshold level used has been too high (step S6).

In this manner, since the light intensity threshold level used at the binary conversion unit 14 varies, the image data stored in the screen memory 15 is also varied. Thus, the process returns to step S1 to cause CPU 17 to receive the revised image data from the screen memory 15 to carry out the above-described steps, and the process is repeated until there is obtained an agreement between the calculated area value and the preset area value. When such an agreement has been found at step S3, the current image data stored in the screen memory 15 is supplied to the man-machine interface via the interface 19 to terminate the process (step S7). If the irradiation distribution is adjusted as in the manner illustrated in FIG. 5c, the coordinates of center of gravity for the thus determined beam periphery are preferably calculated by the image processing system to be supplied to the man-machine interface.

In the man-machine interface, the beam periphery data and center of gravity data supplied from the image processing system are fed into the CRT display device 22 so as to have these data displayed on the screen of CRT display device 22 together with a selected reference mark as in a manner illustrated in FIGS. 5a–5c.

Thus, the adjustment of irradiation distribution, or of orientation of a headlight, can be easily carried out by looking at the visual data displayed on the screen of CRT display device 22. Of course, every time the headlight under examination is adjusted in orientation, the image processing system is set in operation to determine a new beam periphery and its center of gravity, which is then transferred to the CRT display device 22 for visual observation.

Figure 8:
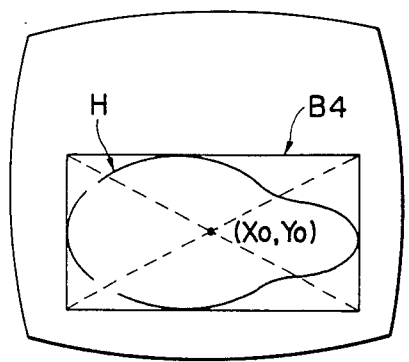
FIG. 8 is a schematic illustration showing the screen of a CRT display on which the irradiation distribution of a light beam is displayed together with reference lines.

FIG. 8 illustrates another embodiment in which, instead of finding a center of gravity, a rectangle B4 definable by the beam periphery H is obtained and its center point ($X_0$, $Y_0$) is used as a reference mark. One method of obtaining the center point ($X_0$, $Y_0$) will be described below with particular reference to FIGS. 9 and 10. First, the image data stored in the screen memory 15 are examined to find a string or segment of picture elements having light intensity which is equal to or larger than the threshold level in each of the scanning lines in the T.V. camera 13, and a row number i ($i=0-n$) is assigned to each of the segments thus found from top to bottom. Then, for each segment, the Y coordinate position, initial X coordinate position the ($X_L$) and the end X coordinate position ($X_R$) are detected and these data are stored into the memory 18 in the order of the segment number. Of course, instead of the end X coordinate position ($X_R$), use may be made of the length of segment (number of picture elements) because the end X coordinate position is obtained as a sum of the initial X coordinate position and the length of segment.

Figure 9:
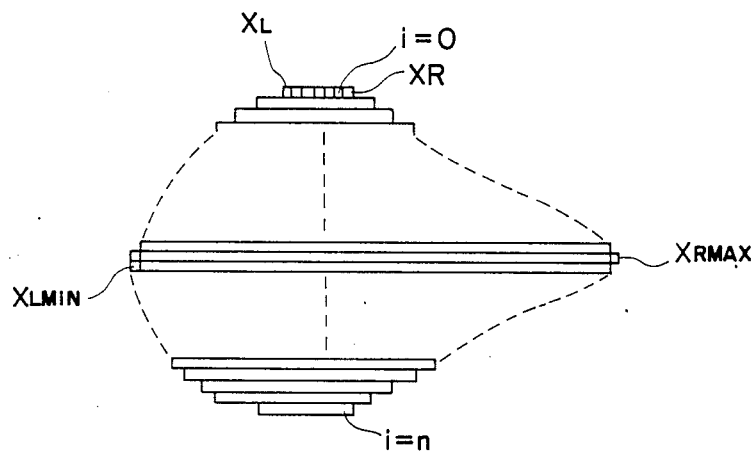
FIG. 9 is a schematic illustration which is useful for explaining a scheme for determining a center of a rectangle defined by a beam periphery of a light beam emitted from a light source in accordance with a further embodiment of the present invention.

As a result, the image data are rearranged in the form of segments $i=0-n$ as shown in FIG. 9 having particular Y coordinate positions, initial X coordinate positions ($X_L$) and end X coordinate positions ($X_R$). In obtaining the center point ($X_0$, $Y_0$) of rectangle B4 definable by the beam periphery H, the coordinate position of $X_0$ may be obtained as a half of the sum of the minimu $X_{LMIN}$ among the initial coordinate positions $X_L$ and the maximum $X_{RMAX}$ among the end coordinate positions $X_R$; on the other hand, the coordinate position of $Y_0$ may be obtained as a half of the sum of the Y coordinate position of segment 0 and the Y coordinate position of segment n.

Figure 10:
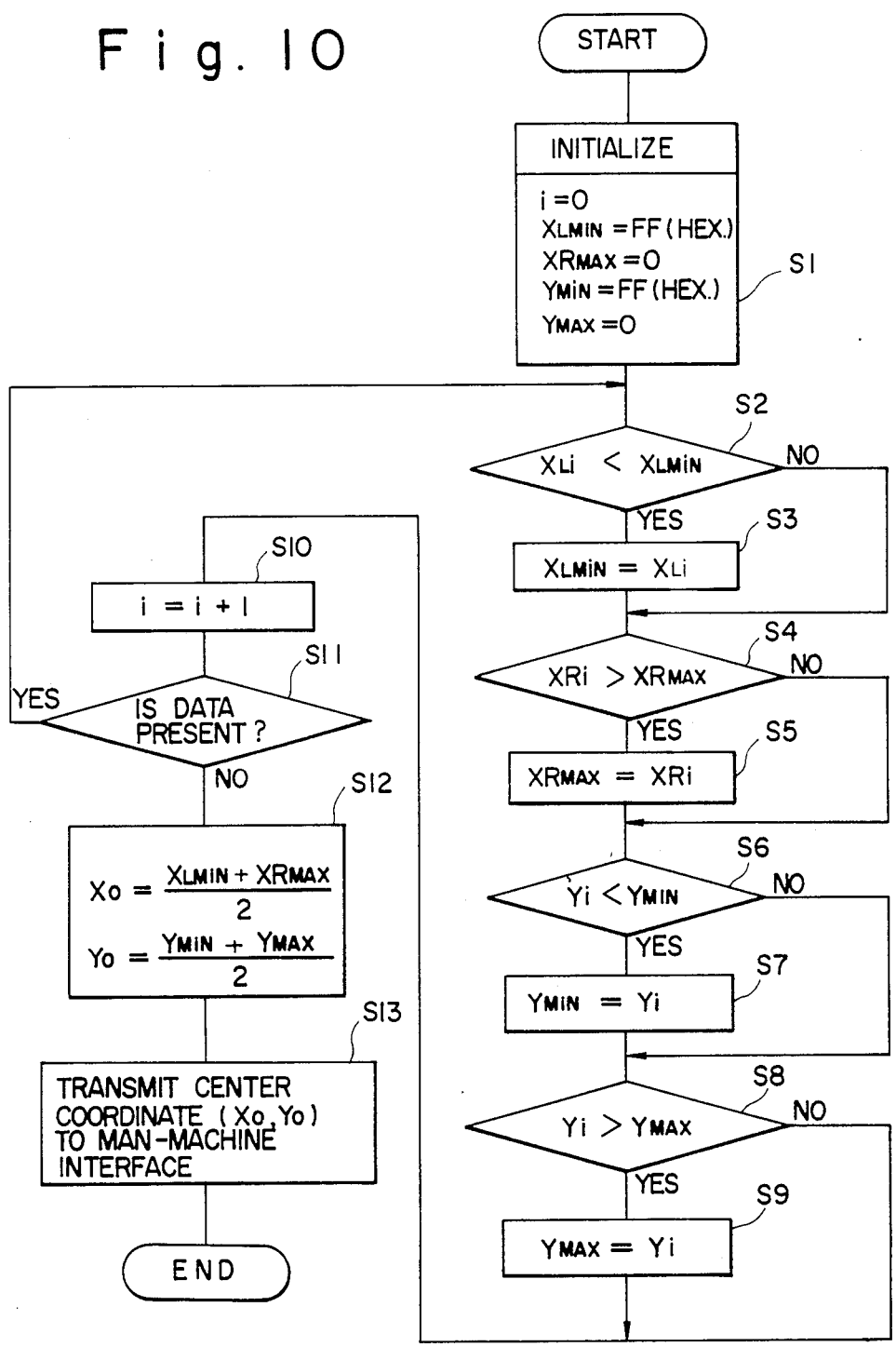
FIG. 10 is a flow chart showing a sequence of steps in implementing the scheme schematically shown in FIG. 9.

Thus, as shown in the flow chart of FIG. 10, using the data stored in the memory 18, the CPU 17 carries out initialization thereby setting such that $i=0$, minimum initial X coordinate position $X_{LMIN}$ and minimum Y coordinate position $Y_{MIN}$ to the maximum hexadecimal number FF and the maximum end X coordinate position $X_{RMAX}$ to 0 (step S1). Then, for segment 0, the initial X coordinate position $X_L$ is compared with the minimum initial X coordinate position $X_{LMIN}$ (step S2), and if $X_{L0}$ is smaller than $X_{LMIN}$, the value of $X_{L0}$ is substituted for the current value of $X_{LMIN}$ (step S3). Similarly, the comparison and renewing of value between the end X coordinate position $X_{R0}$ and the maximum end X coordinate $X_{RMAX}$ (steps S4 and S5), between the Y coordinate position $Y_0$ and the minimum Y coordinate position $Y_{MIN}$ (steps S6 and S7) and between the Y coordinate $Y_0$ and the maximum Y coordinate position $Y_{MAX}$ (steps S8 and S9) are carried out, and, then, the process proceeds to the next segment (step S10) to examine as to whether this is the final segment or not (step S11). If the result of step S11 is negative, the process returns to step S2 to carry out the similar operation as described above.

When the above-described process has been carried out to the final segment, it is now possible to determine the minimum initial X coordinate position $X_{LMIN}$, maximum end X coordinate position $X_{RMAX}$, and Y coordinate positions $Y_{MIN}$ and $Y_{MAX}$ of segments 0 and n, respectively, so that at step S12 the coordinates of center position $(X_0, Y_0)$ can be calculated as in the following manner.

$$X_0 = (X_{LMIN} + X_{RMAX})/2$$

$$Y_0 = (Y_{MIN} + Y_{MAX})/2$$

Then, the thus determined center coordinates $X_0$ and $Y_0$ are supplied to the man-machine interface (step S13).

It is to be noted that the above-described embodiment may be applied if the preset area value for the beam periphery is known. If such information is not known, then the preset area value may be obtained utilizing the property of log S being proportional to the light intensity I as illustrated in FIG. 3 as in the following manner.

That is, since the characteristic curve is approximately linear in the range between log $S_A$ and log $S_B$, a region corresponding to the range between log $S_A$ and log $S_B$ may be found by finding a region in which the second derivative of the characteristic curve with respect to distance has a value which is equal to or larger than a predetermined value. Thus, in accordance with the present invention, the light intensity threshold level at the binary conversion unit 14 shown in FIG. 6 is changed gradually from its minimum value with an increment of delta T, and each time when incremented by delta T, the value of area $S_n$ having the light intensity equal to or larger than the current light intensity threshold level is calculated and its logarithm log $S_n$ is calculated. In order to prevent noises from affecting the calculation by smoothing log $S_n$, a sum of the two adjacent threshold values log $S_{n-1}$ and log $S_{n+1}$ is taken and this sum or ½ of the sum is made a logarithmic value of the threshold level $F_n$.

Here, a derivative dF/dt may be approximated by $(F_n - F_{n+1})/\text{delta } T$ and a second derivative $d^2F/dt^2$ may be approximated by $(F_n - 2F_{n+1} + F_{n+2})/(\text{delta } T)^2$. Since the value of $(\text{delta } T)^2$ is constant, $d^2F/dt^2$ is proportional to $F_n - 2F_{n+1} + F_{n+2}$. Thus, by calculating the value of $F_n - 2F_{n+1} + F_{n+2}$ to find the light intensity threshold level which is equal to or lower than a predetermined value, the value of log $S_n$ under the current light intensity threshold level is taken as a preset area value. Such a calculation may be carried out by the CPU 17 in the system shown in FIG. 6, and the preset area value thus obtained may be supplied to the man-machine interface for further operations.

It is to be noted that in the above-described embodiment, the reading of a light pattern image on screen 2 is carried out by using a T.V. camera. However, the light pattern image on screen 2 may be read by any other appropriate method, for example, by providing a plurality of photoelectric sensors on the screen in the form of a matrix.

It will now be described as to another aspect of the present invention for determining the irradiation distribution of a light beam emitted from a headlight with respect to a reference mark, such as a cut line, point marker and an area marker. FIGS. 11a–11d show several typical examples of a pattern of light intensity distribution of a light beam irradiated from an automobile headlight. As shown, the light distribution patterns can be quite different. In the case shown in FIG. 11a, the equi-irradiation lines are concentrically distributed and the maximum light intensity point M is located at the center of the distribution. In the case shown in FIG. 11b, the equi-irradiation lines are distributed eccentrically and the maximum light intensity point M is located away from the center of the distribution. On the other hand, in the case shown in FIG. 11c, although the equi-irradiation lines are distributed uniformly, its maximum light intensity point is dispersed; whereas, in the case shown in FIG. 11d, there are present more than one maximum light intensity point M. In determining the orientation of a headlight, there arises a problem particularly in the cases shown in FIGS. 11b–11d because the geometrical center point of the light distribution pattern does not agree with the maximum light intensity point of the beam. It is interesting to observe that as shown in FIGS. 11a–11d, the equi-irradiation lines in the outer peripheral portion of the beam are more or less elliptic in shape in all of the cases.

Figure 12A:
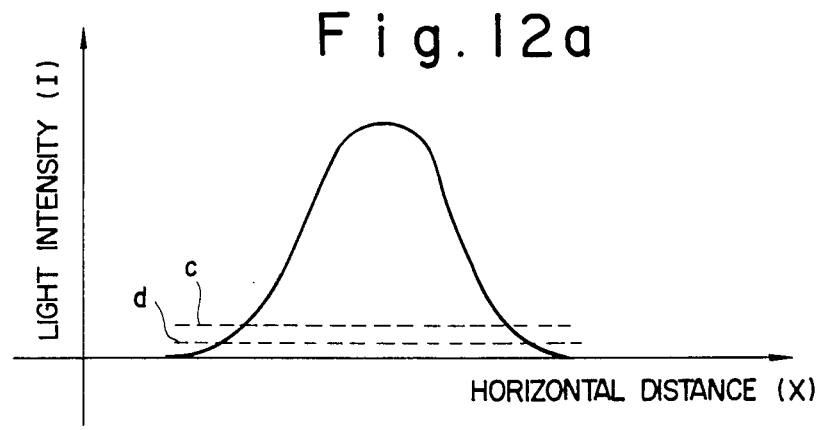
FIGS. 12a-12c are graphs useful for explaining a beam periphery of a light beam emitted from a light source, such as an automobile headlight, and showing how these graphs are developed.
Figure 12B:
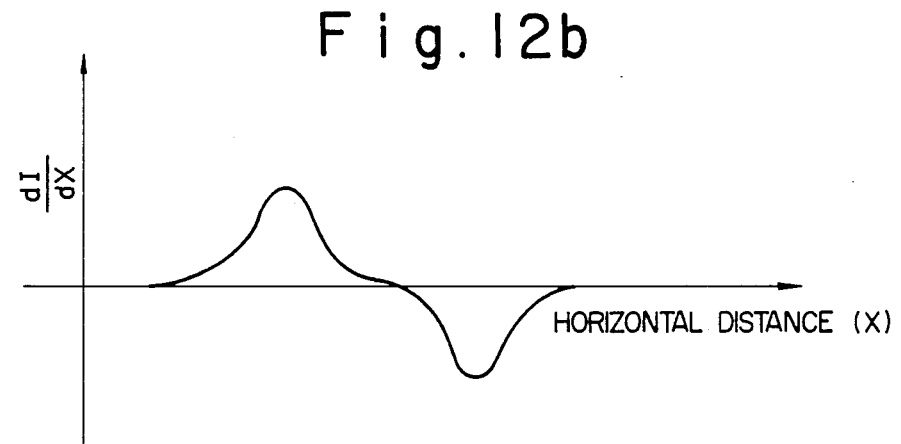
Figure 12C:
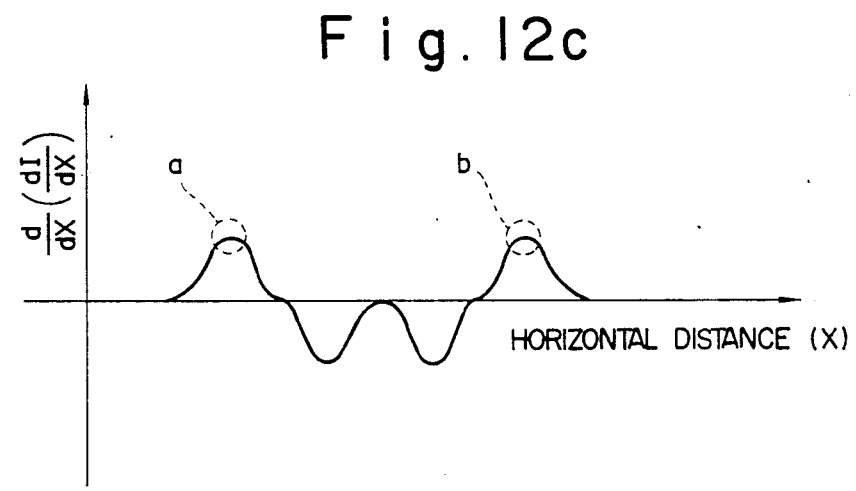

In determining the proper direction of light irradiation by a headlight, use is made of a cut line reference or the concept of hot zone in various countries. However, as discussed above, since the probable most effective region of a light beam emitted from a headlight is the region called "beam periphery" where the positive maximum in the rate of change in light intensity level is present, it is believed to be most preferable to determine such a beam periphery in each light beam to be examined and to compare the thus determined beam periphery or a point therein, such as center of gravity, with some predetermined reference. In this connection, FIGS. 12a–12c are graphs showing how the so-called beam periphery is determined and they correspond to FIGS. 2a–2c. As mentioned above, since the equi-irradiation lines in the outer peripheral portion of a beam, where a beam periphery is present, are approximately elliptic in most of the cases, if four positions of the beam periphery are determined, the center of the beam periphery may be easily obtained.

Figure 13A:
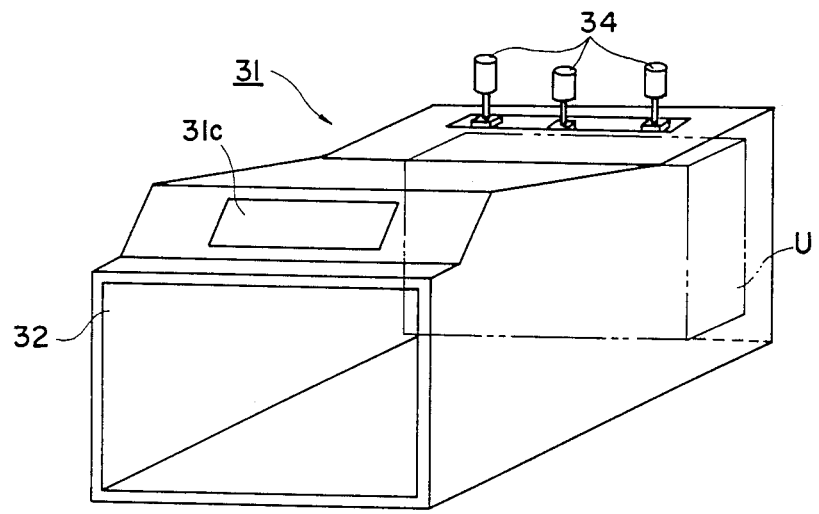
FIGS. 13a and 13b are schematic illustrations showing an apparatus for determining the irradiation distribution of a light beam constructed as embodying the present invention.
Figure 13B:
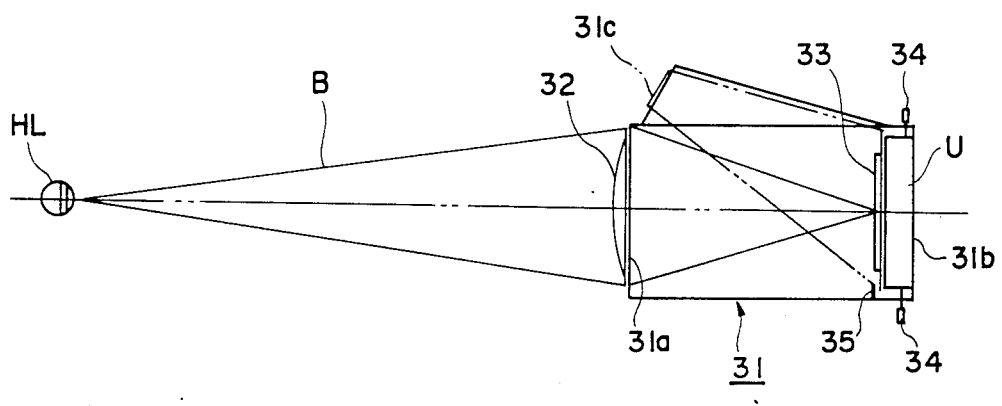

FIG. 13a schematically shows in perspective an apparatus for measuring the irradiation distribution of a light beam emitted from an automobile headlight, and Fig. 13b schematically shows in cross-section the structure of the apparatus shown in FIG. 13a. As shown, the apparatus includes a dark chamber box 31 generally rectangular in shape which has a front end 31a positioned opposite to a headlight HL to be examined and provided with a focusing lens 32. The dark chamber box 31 also has a rear end 31b, the inside surface of which is provided with a measuring unit U, and a half mirror 33 is provided in front of the measuring unit U. Thus, a light beam emitted from the headlight HL after passing through the focusing lens 32 impinges upon the measuring unit U as passing through the half mirror 33. An adjusting screw 34 for moving photoelectric sensors, which will be described later, extends out of the measuring unit U to be exposed out of the dark chamber box 31. Also provided in the dark chamber box 31 is a viewing window 31c at its top, so that an operator can view a scale plate 35 attached to the measuring unit U and the irradiation pattern projected to the measuring unit U through the half mirror 33.

Figure 14:
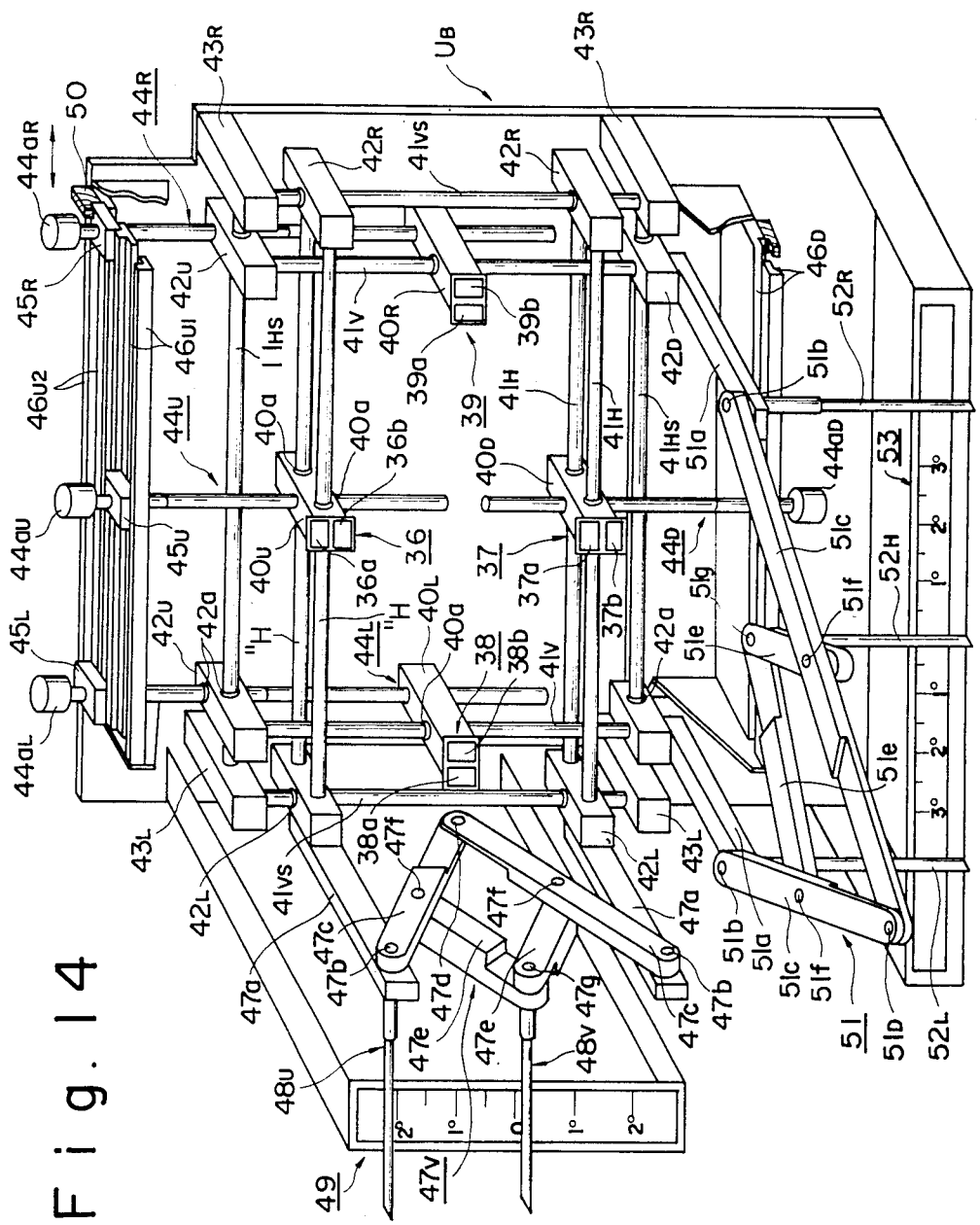
FIG. 14 is a schematic illustration showing on an enlarged scale a main part of the apparatus shown in FIGS. 13a and 13b.

FIG. 14 shows in detail the structure of the measuring unit U housed in the dark chamber box 31. As shown, the measuring unit U includes four pairs of photoelectric sensors 36–39, each comprised of two photoelectric elements. The sensors 36 and 37 are arranged vertically and the sensors 38 and 39 are arranged horizontally. For example, the upper photoelectric sensor 36 includes a pair of photoelectric elements $36a$ and $36b$ disposed as spaced apart from each other over a small gap in the vertical direction for detecting the location of the top edge portion of the light distribution pattern. Similarly, the lower photoelectric sensor 37 includes a pair of photoelectric elements $37a$ and $37b$ disposed as spaced apart from each other over a small gap in the vertical direction for detecting the location of the bottom edge portion of the light distribution pattern. On the other hand, the right and left photoelectric sensors 38 and 39 include paired photoelectric elements $38a$-$38b$ and $39a$-$39b$, respectively, each spaced apart from each other over a small gap in the horizontal direction for detecting the right and left edge portion of the light distribution pattern, respectively. Each of the photoelectric sensors 36-39 is supported by a supporting mechanism to be movable horizontally as well as vertically for detecting the respective intended portions of the light distribution pattern projected thereto.

The upper photoelectric sensor 36 is fixedly attached at a front end face of a rectangular carriage $40u$, through which a pair of movable, horizontally extending rods $41_H$ and $41_H$ extend through sliding bearings $40a$ and $40a$. Both ends of these movable rods $41_H$ and $41_H$ are supported by movable support members $42_R$ and $42_L$, respectively, which, in turn, are supported to be slidable along stationary, vertically extending rods $41_{VS}$ and $41_{VS}$, respectively. The rods $41_{VS}$ and $41_{VS}$ are fixedly supported in position by two pairs of holding members $43_L$-$43_L$ and $43_R$-$43_R$, which are fixedly mounted on a base plate $U_B$ of the measuring unit U. Moreover, a threaded rod $44_U$ threadingly extends vertically through the carriage $40_U$, and the threaded rod $44_U$ has its head supported by a slider $45_U$. The slider $45_U$ is provided to be slidable between a sliding rail $46_{U1}$ fixedly mounted on the base plate $U_B$ as extending horizontally and a holding plate (not shown) so as to be slidable in the horizontal direction. Thus, by grabbing a knob $44_{aU}$ formed at the top of the threaded rod $44_U$, the upper photoelectric sensor 36 may be moved up and down through the carriage $40_U$, pair of rods $41_H$, $41_H$ and movable support members $42_L$, $42_R$. Furthermore, by moving the slider $45_U$ along the rail $46_{U1}$, the photoelectric sensor 36 may be moved in the horizontal direction together with the threaded rod $44_U$ and carriage $40_U$.

Similarly, there is provided a supporting mechanism for the lower photoelectric sensor 37 so as to move it horizontally as well as vertically. In this case, the corresponding slide rail $46_D$ is provided below the photoelectric sensor 37, so that by grabbing a knob $44_{aD}$ formed at the bottom of a threaded rod $44_D$ projecting below the slide rail $46_D$ to rotate the rod $44_D$, the lower photoelectric sensor 37 may be moved up and down along the stationary rods $41_{VS}$, $41_{VS}$, together with a carriage $40_D$, pair of movable rods $41_H$, $41_H$ and movable support members $42_L$, $42_R$. It should be understood that a slider similar to the one $45_U$ is provided to be slidable along the rail $46_D$ so that the photoelectric sensor 37 may be moved horizontally together with the threaded rod $44_D$ and carriage $40_D$.

Also provided in the structure of FIG. 14 is a vertical pantagraph $47_V$ as fixedly attached to the movable support members $42_L$, $42_L$. The pantagraph $47_V$ includes a pair of stays $47a$, $47a$ which extend horizontally from respective movable support members $42_L$, $42_L$. A pair of first arms $47c$, $47c$ pivotally joined at pivot $47d$ at one end have their opposite ends pivoted to the forward ends of respective stays $47a$, $47a$ at pivots $47b$, $47b$. A pair of second arms $47e$, $47e$ having their one ends pivotally connected at pivot $47g$ are pivotally connected to respective first arms $47c$, $47c$ as pivoted thereto at pivots $47f$, $47f$. At the forward end of the upper stay $47a$ is fixedly provided a first needle $48_U$ for indicating the top edge portion of projected light pattern and/or the location of cut line, and a second needle $48_V$ is fixedly attached to the pivot $47g$ for indicating the position midway between the top and bottom edge portions of projected light pattern. Also provided is a scale plate 49 as fixedly mounted on the base plate $U_B$ and located adjacent to the first and second needles $48_U$ and $48_V$. The scale plate 49 is arranged with its reference point corresponding to the optical axis of the focusing lens 32. It is to be noted that it is so structured that the mid-point between the photoelectric elements $36a$ and $36b$ of upper photoelectric sensor 36 corresponds in vertical position to the first needle $48_U$ so that the position of the first needle $48_U$ automatically indicates the position the edge portion of projected light pattern or cut line, and the position of the second needle $48_V$ indicates the midpoint between the top and bottom edge portions of projected light pattern.

On the other hand, the left photoelectric sensor 38 is fixedly mounted on a carriage $40_L$ which is slidably supported on the vertically extending movable rod $41_V$ through a sliding bearing $40a$, and the rod $41_V$ is supported by movable support members $42_U$, $42_D$ on both ends. These movable support members $42_U$, $42_D$ are slidably supported on respective horizontally extending, stationary rods $41_{HS}$, $41_{HS}$, which are fixedly supported by stationary support members $43_L$, $43_R$ and $43_L$, $43_R$, respectively, through sliding bearings $42a$, $42a$. A threaded rod $44_L$ is provided as extending in the vertical direction as threadingly extending through the carriage $40_L$. The threaded rod $44_L$ has its head supported by a slider $45_L$ as resting thereon. In addition, the threaded rod $44_L$ also slidably extends through the movable support member $42_U$ through a sliding bearing $42a$. The slider $45_L$ is so provided to be slidable between a slide rail $46_{U2}$, which is disposed adjacent to and in parallel with the previously described slide rail $46_{U1}$, and a holding plate 50, so that the slider $45_L$ may execute a horizontal sliding motion.

With the above-described structure, when a knob $44_{aL}$ formed at top of the threaded rod $44_L$ is grabbed and rotated in a desired direction, the photoelectric sensor 38 may be moved up and down along the rod $41_V$, together with the carriage $40_L$. Furthermore, if the slider $45_L$ is slidingly moved along the rail $46_{U2}$, the photoelectric sensor 38 may be moved in the horizontal direction along the rods $41_{HS}$, $41_{HS}$, together with the movable support members $42_U$, $42_D$, movable rod $41_V$ and carriage $40_L$.

A similar supporting structure is also provided for the right photoelectric sensor 39, and, thus, by grabbing a knob $44_{aR}$ to cause a threaded rod $44_R$ to rotate in a desired direction, the sensor 39 may be moved up and down along the movable rod $41_V$ together with a carriage $40_R$. Furthermore, by moving a slider $45_R$ along a rail $46_{U2}$, the sensor 39 may be moved in the horizontal direction along the stationary rods $41_{HS}$, $41_{HS}$, together with the threaded rod $44_R$, movable support members $42_U$, $42_D$, movable rod $41_V$ and carriage $40_R$.

Also provided is a second pantagraph 51 as fixedly attached to the bottom movable support members $42_D$, $42_D$. That is, the pantagraph 51 includes a pair of stays 51a, 51a each extending horizontally in the forward direction from the corresponding one of the support members $42_D$, $42_D$. A pair of first arms 51c, 51c are provided with their one ends pivotally connected at pivot $51_D$ and their opposite ends pivotally connected to the forward end portions of respective stays 51a, 51a and pivoted at pivots 51b, 51b. A pair of second arms 51e 51e are provided with their one ends pivotally connected at pivot 51g and their opposite ends pivotally connected to the respective first arms 51c, 51c at pivots 51f, 51f. The second pantagraph 51 is provided with a third needle $52_L$ for use in indicating the left edge portion of projected light pattern as fixedly attached to the forward end portion of the left stay 51a and with a fourth needle $52_H$ for use in indicating the midpoint between the detected left and right edge portions of projected light pattern as fixedly attached to the pivot 51g. The second pantagraph 51 is also provided with a fifth needle $52_R$ for use in indicating the right edge portion of projected light pattern as fixedly attached to the forward end portion of the right stay 51a. Also provided corresponding in position to these needles $52_L$, $52_H$ and $52_R$ is a second scale plate 53 as fixedly mounted on the base plate $U_B$, so that the positions of respective needles may be read by direct visual observation.

Figure 15:
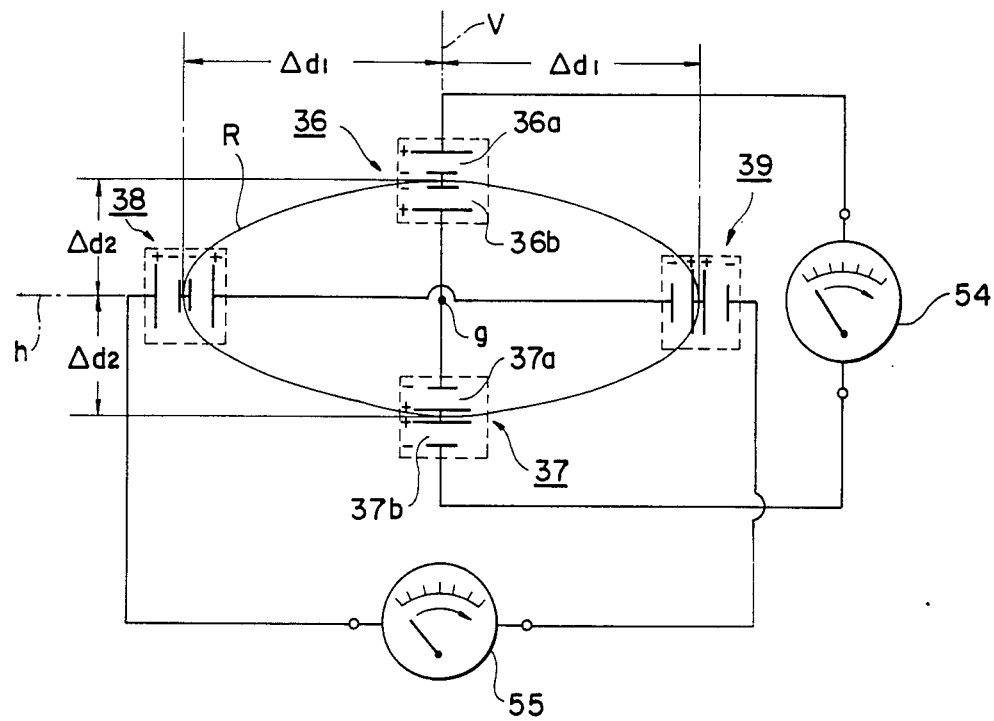
FIG. 15 is a schematic illustration showing an electrical structure provided in the apparatus shown in FIGS. 13a and 13b.

An electrical structure for processing electrical signals obtained from the photoelectric sensors 36–39 provided in the apparatus shown in FIGS. 13a and 13b is schematically shown in FIG. 15. As shown, in each of the sensors 36–39, the paired photoelectric elements, e.g., 36a and 36b, are connected in series with leads of the same polarity connected together. Furthermore, the upper and lower sensors 36 and 37 are electrically connected such that the remaining terminals, opposite in polarity, of those photoelectric elements 36b and 37a which are located within the projected light pattern R are connected to each other. On the other hand, the remaining terminals, opposite in polarity, of those photoelectric elements 36a and 37b which are located outside of the projected light patter R are connected to a meter 54. Thus, an algebraic sum of outputs from the respective sensors 36 and 37 may be indicated in the meter 54. A similar wiring is provided for a circuit including the sensors 38 and 39, and, thus, an algebraic sum of outputs from the respective sensors 38 and 39 may be indicated in a meter 55.

The operation of the above-described structure will now be described. In the first place, as shown in FIG. 13b, the dark chamber box 1 is set in position as opposite to the headlight HL to be tested such that the headlight HL is located within a range between the top and bottom of the focusing lens 32. Then, the headlight HL is turned on to emit a light beam B which is projected into the box 31 through the focusing lens 32 and half mirror 33 onto the measuring unit U. Under this condition, because of the presence of the viewing window 31c, the projected light pattern R on the half mirror 33 as shown in FIG. 15 may be viewed from the exterior. Thus, by manipulating the threaded rod $44_U$ and slider $45_U$, the upper photoelectric sensor 36 is located at the top edge portion of the projected light pattern R through visual observation. Then, while keeping an eye on the vertical meter 54, the threaded rod $44_D$ and slider $45_D$ are manipulated to move the lower sensor 37 vertically as well as horizontally until a maximum reading in the meter 54 is attained, under which the lower sensor 37 is located at the lowermost edge of the projected light pattern R with the pantagraph 47 being opened at maximum and the needles $48_V$ and $48_U$ being separated away from each other at maximum. A similar operation is carried out for the horizontally spaced sensors 38 and 39, and, under this condition, the horizontal meter 55 shows a maximum reading with the needles $52_L$ and $52_H$ or $52_R$ separated away from each other at maximum. In this case, since each of the sensors 36–39 is moved while visually observing the projected light pattern R, it may be easily located at a desired position accurately and rapidly. Thus, the center point of projected light pattern R may be determined at a midpoint between the vertically arranged sensors 36 and 37 and another midpoint between the horizontally arranged sensors 38 and 39. That is, a cross point g between the needles $48_V$ and $52_H$ indicates the center of projected light pattern R, and, thus, an imaginary line connecting the center of headlight HL and the cross point g defines an irradiation axis of light beam B.

Figure 16:
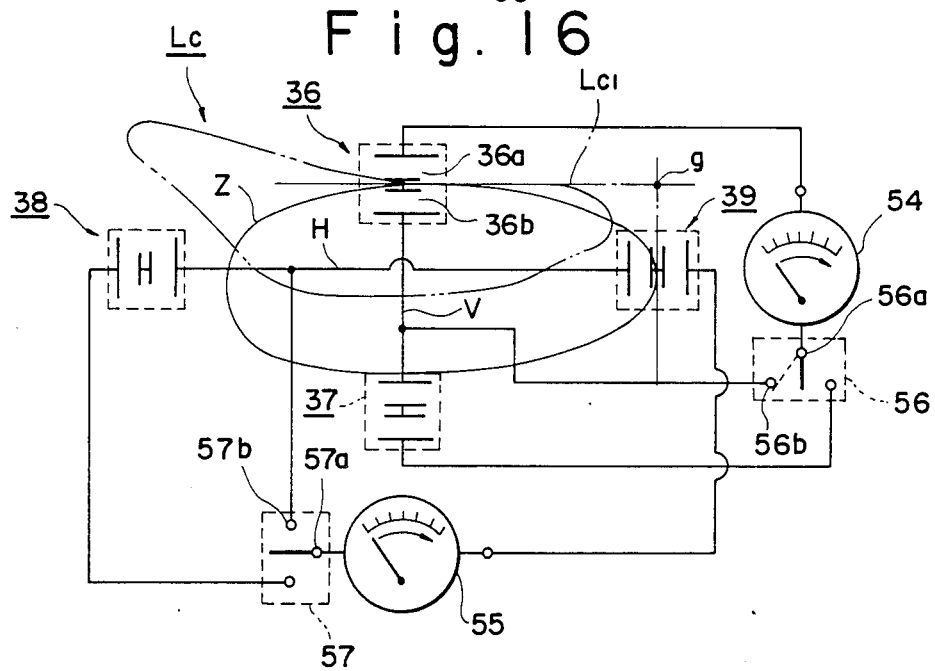
FIGS. 16 and 17 are schematic illustrations showing modified electrical structures which are advantageously applicable to the apparatus shown in FIGS. 13a and 13b.

FIG. 16 shows a modified structure which is similar to the structure shown in FIG. 15 excepting that two-way switches 56 and 57 are provided. That is, in the structure of FIG. 16, a two-way switch 56 is provided as connected between the vertical meter 54 and the lower sensor 37 and another two-way switch 57 is provided as connected between the horizontal meter 55 and the left sensor 38. The switch 56 has a common terminal 56a which is connected to the meter 54, a first contact connected to the line V interconnecting the sensors 36 and 37, and a second contact connected to the outer terminal of lower sensor 37. Similarly, the switch 57 has a common terminal 57a connected to the meter 55, a first contact connected to the line H interconnecting the sensors 38 and 39, and a second contact connected to the outer terminal of left sensor 38.

With the structure shown in FIG. 16, it is easy to detect not only the center of projected light pattern, but also relevant edge portions of projected light pattern in connection with a predetermined cut line or hot zone. Described more in detail, if it is desired to examine a projected light pattern with respect to a predetermined cut line $L_c$ as indicated by the two-dotted line in FIG. 16, it is only necessary to operate the switch 56 for establishing a connection between the terminal 56a and contact 56b as indicated by the dotted line, thereby causing the bottom terminal of the meter 54 to be connected to the inner sensor 36b. When so connected, an algebraic sum of outputs from the respective photoelectric elements 36a and 36b may be indicated on the meter 54. Under this condition, the headlight HL to be tested is changed to a low beam condition. Then, similarly to the previous embodiment, while paying attention to a reading of the meter 54, the upper sensor 36 is moved vertically as well as horizontally until the maximum reading is attained in the meter 54. With the maximum reading at the meter 54, the position of the needle $48_U$ on the scale plate 49 indicates the position of horizontal portion $L_{c1}$ of cut line $L_c$.

On the other hand, if it is desired to determine edge portions of a projected light pattern in order to determine its hot zone Z as indicated in FIG. 16, it is only necessary to operate both of the switches 56 and 57 such that the common terminals 56a and 57a are connected to contacts 56b and 57b, respectively, thereby allowing net outputs from the sensors 36 and 39 to be indicated on the meters 54 and 55, respectively. Under this condition, the headlight HL is switched to a low beam mode and the sensors 36 and 39 are moved to positions where they are located to the topmost and rightmost edge portions of the projected light pattern with maximum readings on the respective meters 54 and 55. When the sensors 36 and 39 are so located, a cross point g between horizontal and vertical lines extended from the current needles $48_U$ and $52_R$, respectively, determines a reference point in determining the location of hot zone Z. Such a reference point g may be easily determined by reading the values on the scale plates 49 and 53 indicated by the needles $48_U$ and $52_R$, respectively.

Figure 17:
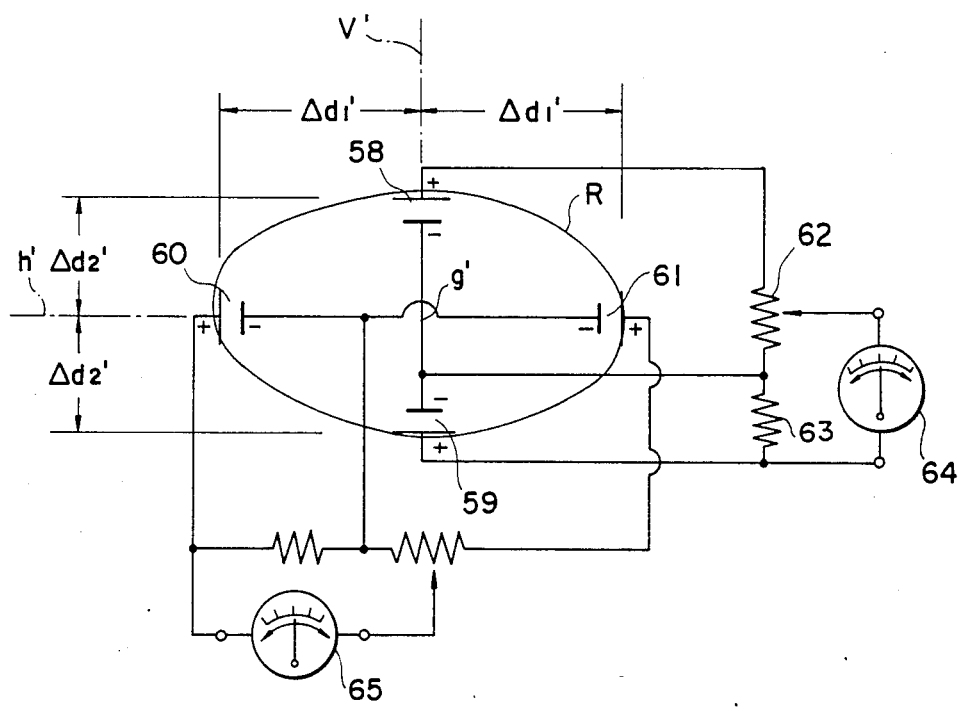

FIG. 17 shows a further embodiment of the present invention, in which the measuring unit U is provided with only four photoelectric elements 58-61 arranged vertically and horizontally with respect to a projected light pattern R to be examined. It should be understood that each of the photoelectric elements 58-61 is provided to be individually movable in the vertical direction as well as in the horizontal direction, as in the previously described embodiments. As shown in FIG. 17, the upper element 58 has its negative terminal connected to a negative terminal of lower element 59, and a variable resistor 62 and a constant resistor 63 are connected in series between the positive terminals of upper and lower elements 58 and 59. Also provided is a vertical balance type meter 64 having its one terminal connected to the positive terminal of lower element 59 and the other terminal connected to a movable terminal of the variable resistor 62. With such a structure, an algebraic sum of outputs from the respective upper and lower photoelectric elements 58 and 59 may be indicated in the meter 64. A similar wiring is effected between the left and right photoelectric elements 60 and 61 with a horizontal balance meter 65 connected appropriately so as to allow to indicate an algebraic sum of outputs from the respective elements 60 and 61.

Now, a method of determining the center of projected light pattern R using the structure illustrated in FIG. 17 will be described. As shown in FIG. 13b, first, the headlight HL is located opposite to the focusing lens 32 of dark chamber box 31, and the headlight HL is turned on to have the light beam B projected onto the measuring unit U inside of the box 31. Under this condition, as shown in FIG. 17, the upper element 58 is first moved to the topmost edge portion of pattern R while observing visually through the window $31_c$. Then, while watching the meter 64, the lower element 59 is moved vertically as well as horizontally until zero reading is attained in the meter 64 with the outputs from the respective elements 58 and 59 thus being balanced. A similar operation is carried out for the left and right elements 60 and 61. As a result, the center of projected light pattern R may be obtained as a cross point g' between line v' connecting elements 58 and 59 and line h' connecting elements 60 and 61. Such a cross point may be directly read from the scale plates 49 and 53 with the help of needles $48_V$ and $52_H$.

In the above-described embodiment, provision has been made of four photoelectric elements. However, as an alternative embodiment, it may be so structured with only a pair of photoelectric elements as long as such a pair of elements are provided to be rotatable in a plane normal to the optical axis A.

Figure 18:
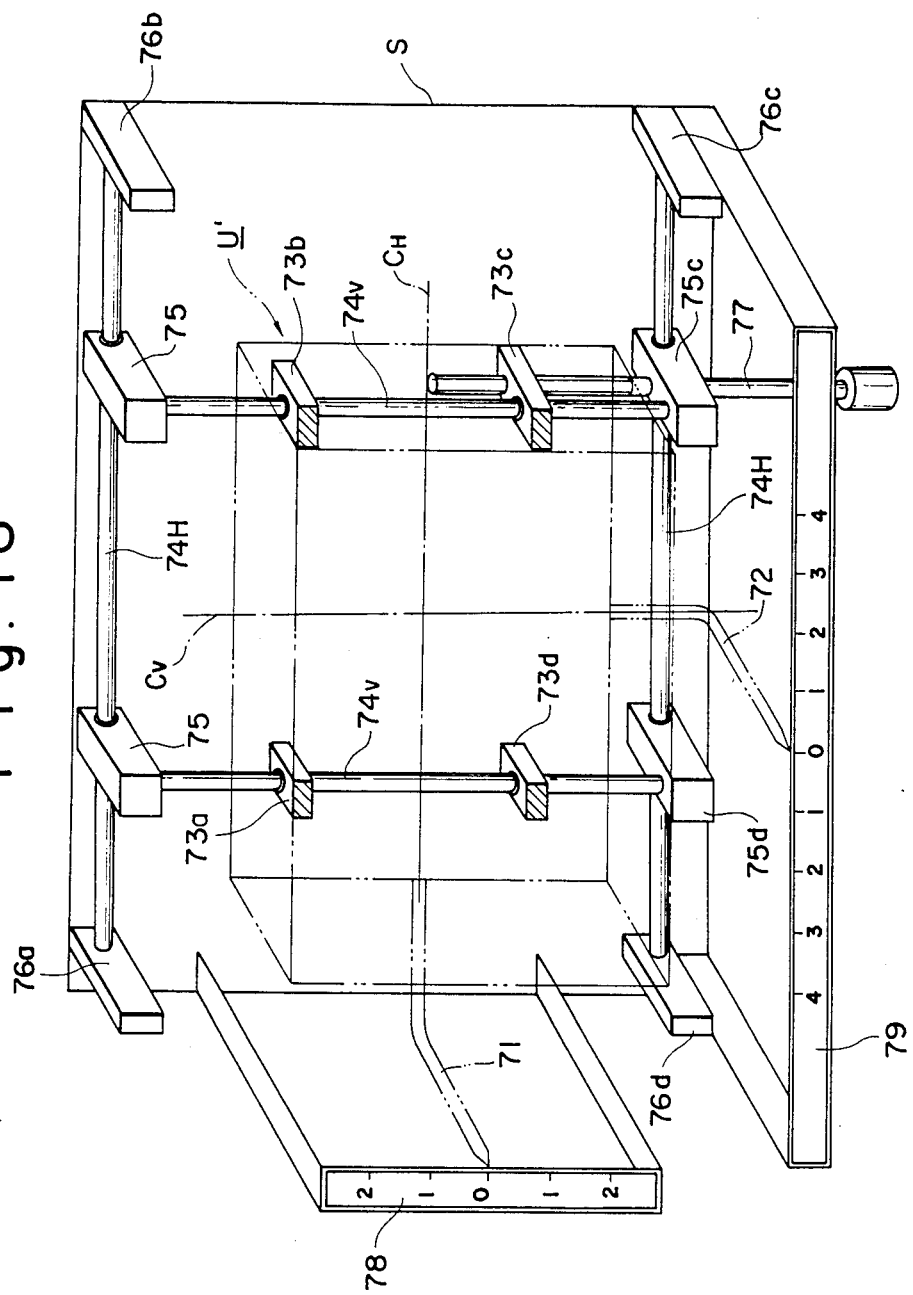
FIG. 18 is a schematic illustration showing a mechanism for supporting a measuring unit in the apparatus shown in FIGS. 13a and 13b.

FIG. 18 shows a still further embodiment of the present invention, in which a modified measuring unit U', which is defined from the measuring unit U of FIG. 14 by having the scale plates 49 and 53 separated therefrom, itself is provided to be movable horizontally as well as vertically thereby allowing the user to attain an increased measuring accuracy. In the structure shown in Fig. 18, the modified measuring unit U' indicated by the two-dotted line is provided with indicator needles 71 and 72 which indicate the center positions $C_V$ and $C_H$ in vertical and horizontal directions of the modified measuring unit U'. The modified measuring unit U' is fixedly provided with four carriages 73a-73d, in which the carriages 73a and 73d are slidably supported on a vertical rod $74_V$ and the carriages 73b and 73c are slidably supported on another vertical rod $74_V$. These vertical rods $74_V$, $74_V$ are supported by paired movable support members 75a,75d and 75b,75c, respectively, with the movable support members 75a,75b and 75c 75d being slidably supported on upper and lower horizontally extending rods $74_H$, $74_H$, respectively. The rods $74_H$, $74_H$ are fixedly attached to stationary support members 76a, 76b and 76c, 76d, which, for example, project from the casing S of dark chamber box 31. In the illustrated structure, a threaded rod 77 is provided as threadingly extending through the carriage 73c fixedly attached to the modified measuring unit U', and the threaded rod 77 rotatably supported by the movable support member 75c. In this example, scale plates 78 and 79 are provided as fixedly attached to the casing S of dark chamber box 31.

With the above-described structure, when the threaded rod 77 is rotated in a desired direction, the modified measuring unit U' may be moved vertically along the vertical rods $74_V$, and the modified measuring unit U' may be moved horizontally along the horizontal rods $74_H$. Thus, prior to initiation of measuring operation, the modified measuring unit U' may be moved vertically as well as horizontally to be located with its needles 71 and 72 indicating the respective zero points in the respective scale plates 78 and 79. In this manner, the modified measuring unit U' may be aligned with the scales 78 and 79 thereby allowing to obtain an increased accuracy in measurement.

It should further be noted that use may be made of any well-known photoelectric elements in any of the embodiments described above, as long as they can carry out conversion between electrical and optical signals. For example, use may be preferably made of such elements as photovoltaic cells and photodiodes.

Now, a further aspect of the present invention for automatically adjusting the orientation of a light source, such as an automobile headlight, which emits a beam of light or the projecting direction of light beam will be described.

Figure 19:
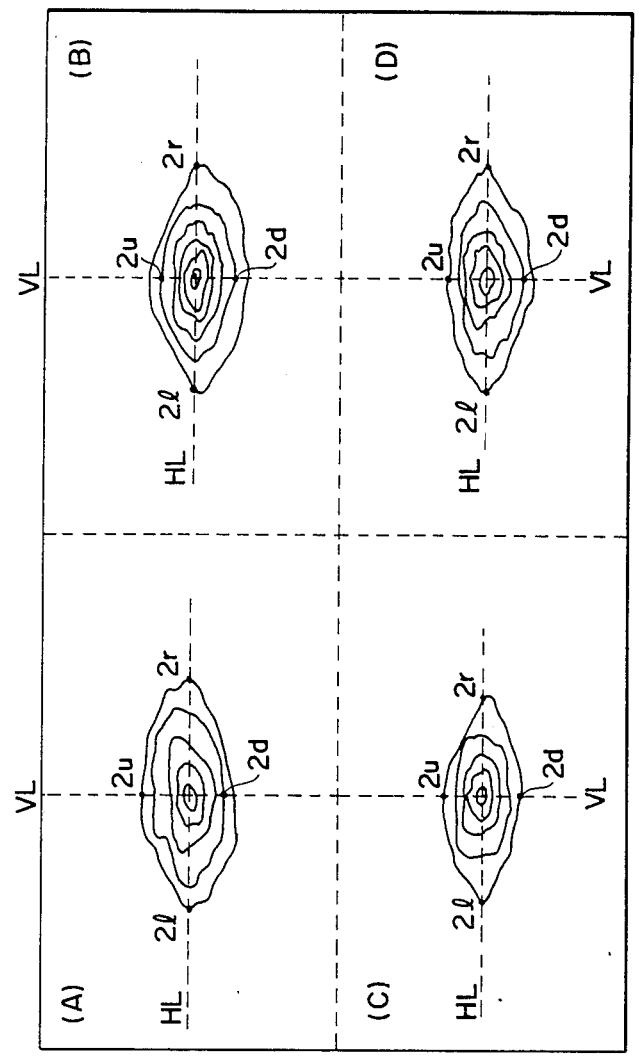
FIG. 19 is a schematic illustration showing a screen for adjusting the direction of a light beam emitted from an automobile headlight constructed as embodying the present invention.

FIG. 19 illustrates a screen to which a beam of light emitted from a headlight to be examined is projected and which includes four quadrants, each provided with four photoelectric elements 2u, 2d, 2l and 2r for determing the projection direction of a light beam when irradiated, so as to examine and adjust two headlights of a car which may take a high beam mode and a low beam mode. As mentioned above, the screen is divided into four quadrants A, B, C and D, each of which is provided with an imaginary vertical reference line VL and an imaginary horizontal reference line HL. The quadrant A is provided for examining the projecting direction of the left headlight of a car in a high beam mode and provided with four photoelectric elements 2u, 2d, 2l and 2r arranged vertically as well as horizontally. The quadrant C is provided for examining the projecting direction of the left headlight in a low beam mode and it is constructed similarly to the quadrant A. The other quadrants B and D are for the right headlight of a car and they are also similarly constructed.

It is to be noted that the all of the photoelectric elements provided in the screen of FIG. 19 are fixed in position thereby defining proper projecting directions of light beams when projected thereto. That is, the cross point between the horizontal and vertical reference lines HL and VL in each of the quadrants A-D is previously set to correspond to a proper projecting direction of a light beam. Thus, if the projected light pattern indicated by equi-irradiation lines in each of the quadrants A-D is so located with its center point in agreement with the cross point of the quadrant in question, the outputs from the respective paired photoelectric elements $2u$, $2d$ and $2l$, $2r$ are balanced so that it may be said that the light beam is directed in a proper direction.

FIG. 20 shows in block form a system for automatically adjusting the orientation of a headlight HL so as to direct the light beam emitted therefrom to be directed in a proper irradiation direction, which is to be used in combination with the screen illustrated in FIG. 19. The photoelectric elements 82, sixteen in total, fixedly provided at predetermined positions on the projection screen are individually connected to a switch circuit 83 through respective resistors $R_0$. The switch circuit 83 is also connected to turnover switches 84a, 84b and 84c. These turnover switches are provided to switch right-/left and top/bottom headlights of a car and to switch the vertically arranged/horizontally arranged pairs of photoelectric elements 82. In addition, the switch circuit 83 is connected to four buffer amplifiers 85u, 85d, 85l and 85r, each corresponding to each of the four photoelectric elements $2u$, $2d$, $2l$ and $2r$ in each of the four quadrants A-D. The top and bottom buffer amplifiers 85u and 85d are connected to a vertical comparator 86r where two electrical signals $V_1$ and $V_2$ which have been obtained by amplifying outputs from the top and bottom photoelectric elements $2u$ and $2d$, respectively, are compared to determine a difference therebetween and the sign of the difference. Similarly, the left and right buffer amplifiers 85l and 85r are connected to a horizontal comparator 86h where two electrical signals $V_3$ and $V_4$ which have been obtained by amplifying outputs from the left and right photoelectric elements $2l$ and $2r$, respectively, are compared to determine a difference therebetween and its sign.

Each of the comparators 86r and 86h is connected to three output leads a, b and c, in which lead a is selected if the difference $V_1-V_2$ is negative and lead b is selected if the difference $V_1-V_2$ is positive. Each of leads a and b is divided into two leads, so that lead a is connected not only to a second amplifier 87a, but also to a second comparator 88, where the absolute value of the difference between $V_1$ and $V_2$ is compared with a predetermined reference value. On the other hand, the lead b is connected not only to another second amplifier 87b, but also to the second comparator 88. The second amplifiers 87a and 87b are then connected to a motor control circuit 89 for controlling the operation of a motor M, which is engageable with a mounting structure of each of the headlights HL mounted in a car such that it changes the orientation of the headlight HL, for example, by tightening or loosening one or more of screws used to mount the headlight HL. The motor M may be provided as mounted on a car, or it may be provided as mounted on a robot arm in an assembly line.

The second comparator 88 is then connected to ground through a pass/fail lamp PL, which is lit to indicate the pass condition if the absolute value of the difference between $V_1$ and $V_2$ is smaller than a predetermined reference value epsilon. The remaining lead c extending from each of the first comparators 86r and 86h is directly connected to the motor control circuit 89 and this lead c selectively supplies a stop signal to the motor control circuit 89 if the judgement at the second comparator 88 indicates the pass condition to deactivate the motor M.

With the above-described system for automatic adjustment in orientation of headlight HL, its operation will now be described with particular reference to the flow chart of FIG. 21. In the first place, a car having headlights HL to be tested is driven into a predetermined location opposite to the screen illustrated in FIG. 19, and the motor M, if it is fixedly mounted in the car, is connected to the present system of FIG. 20. Then one of the headlights HL is turned on in either a high beam mode or a low beam mode to be irradiated against the screen in one of its quadrants A-D. Then, the turnover switches 84a-84c are operated appropriately. For example, the switch 84c is operated to select the vertically arranged photoelectric elements $2u$ and $2d$ into operation. Thus, outputs from the photoelectric elements $2u$ and $2d$ in the quadrant A to which the light beam from the headlight HL is projected are supplied into the first amplifiers 85u and 85d, respectively, depending on the level of light intensity at each of the elements $2u$ and $2d$. The outputs thus supplied to the first amplifiers 85u and 85d are amplified and supplied to the vertical comparator 86r.

Figure 22A:
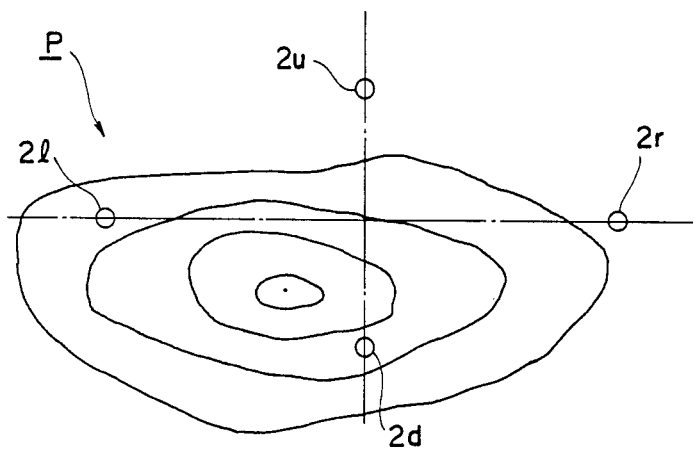
FIGS. 22a and 22b are schematic illustrations which are also useful for explaining the operation of the system shown in FIG. 20 when used with the screen shown in FIG. 19.
Figure 22B:
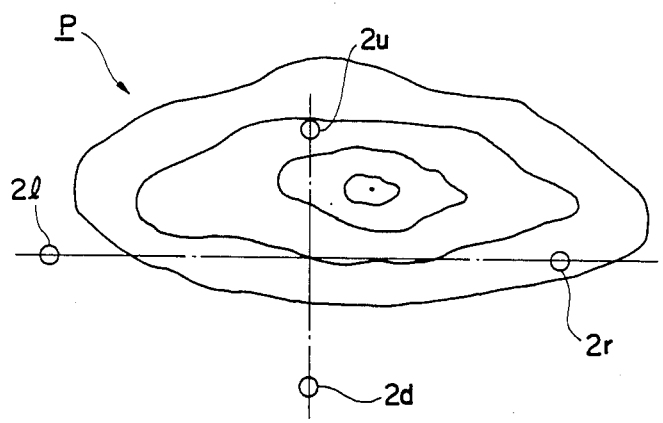

At the comparator 86r, voltage signals $V_1$ and $V_2$ supplied as amplified from the amplifiers 85u and 85d, respectively, are processed to produce a difference between $V_1$ and $V_2$, and, then, its sign is checked to determine which of the output leads a-c to be selected for operation. That is, if the projected light pattern P is too low as shown in FIG. 22a thereby causing the difference $V_1-V_2$ to be negative in value, the circuit a is selected for operation; whereas, if the projected light pattern P is too high as shown in FIG. 22b thereby rendering the difference $V_1-V_2$ to be positive in value, lead b is selected for operation. Immediately after selection of an appropriate output lead in this manner, the absolute value of this difference $V_1-V_2$ is compared with a predetermined reference value epsilon, the result of which determines which output lead is to be selected for operation.

In this case, supposing that the reference value epsilon indicates an allowable range for a difference of voltage signals, if the light pattern projected on the screen is located far away from the proper location at the initial stage of operation, then the absolute value of difference $V_1-V_2$ is larger than epsilon. Then, if the difference $V_1-V_2$ is negative in value, the comparator 86r supplies an activation signal to the motor control circuit 89 through the second amplifier 87a so that the motor M is driven to rotate, for example, in the clockwise direction. When the motor M is driven to rotate clockwise in this manner, the headlight HL is directed upward thereby bringing the light pattern projected on the screen to the predetermined proper location. On the other hand, if the difference $V_1-V_2$ is positive in value, then the comparator 86r supplies an activation signal to the motor control circuit 89 through the other second amplifier 87b so that the motor M is driven to rotate counterclockwise. Thus, in this instance, the headlight HL is directed downward due to the counterclockwise rotation of the motor M to bring the projected light pattern into agreement with the previously determined proper location.

As the orientation of headlight HL is adjusted as described above, the light pattern projected on the screen varies in position and often times in distribution so that the level of light intensity at each of the photoelectric elements 2u, 2d, 2l and 2r also varies. Such a change is continuously monitored by the present system. In other words, there is a feedback loop as indicated by the dotted line in FIG. 20 extending from the headlight HL to the photoelectric elements 82. Thus, the difference between voltage signals $V_1 - V_2$ is gradually reduced in value and finally the absolute value of the difference $V_1 - V_2$ in voltage signals from the vertically arranged photoelectric elements 2u and 2d becomes smaller than the predetermined reference value epsilon. If this happens, the second comparator 88 is activated to have the pass/fail lamp PL lit, and, at the same time, a stop signal is supplied from the first comparator 86r to the motor control circuit 89 to have the motor M deactivated. In this manner, the vertical orientation of headlight HL is properly determined.

Then, the turnover switch 84c is operated to switch to the horizontally arranged photoelectric elements 2l and 2r. Thus, the photoelectric elements 2l and 2r are operatively connected to the first amplifiers 85l and 85r, respectively, and an operation similar to that described with respect to the vertically arranged photoelectric elements 2u and 2d is carried out, thereby determining the proper horizontal orientation of headlight HL. Such an operation may be carried out with the headlight HL in a low beam mode or a high beam mode.

In the above-described embodiment, the proper orientation of a headlight HL is adjusted using the center point of a projected light pattern. It should, however, be noted that such an adjustment is also carried out using the so-called beam periphery and a reference line defining a reference cut line or hot zone. It should further be noted that the photoelectric elements 82 may be provided to be movably set in desired locations on the screen and/or the reference value epsilon may be varyingly set depending on the kind of headlight HL used. If so provided, the present system may be used to adjust various types of headlights with a minimum of modifications.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for determining a projecting direction of a light beam emitted from a light source, comprising the steps of:
   projecting a light beam from a light source toward a screen placed opposite to said light source;
   reading a light pattern of said light beam projected on said screen to produce analog image data of the radiant intensity of light segments which comprise said light pattern;
   defining a range of light segments comprising said light pattern in which a proportionality relation holds between log S and I wherein I equals a given radiant intensity level and S equals the light segments within said light pattern with radiant intensity level equal to or greater than I;
   said proportionality relation being such that a curve representing the rate of change in light intensity with respect to the log of S will be linear irrespective of the light source used;
   selecting a reference area comprising said segments of said light pattern wherein said segments are within a range in which said proportionality relation between log S and I holds;
   finding a region corresponding to said selected area of said light pattern by threshold determination from said analog image data of said segments of said light pattern so that said region is comprised of light segments having a radiant intensity equal to or greater than I; said region thereby determining the contour of a beam periphery of said projected light beam; and
   determining a projecting direction of said light beam using said region thus found by comparing said region, or a point within said region with predetermined reference marks corresponding to correct alignment and orientation of said headlight.

2. The method of claim 1 further comprising a step of determing an outer contour of said region, and said step of determining a projecting direction is carried out using said outer contour thus determined.

3. The method of claim 1 further comprising a step of calculating a reference point in said region, and said step of determining a projecting direction is carried out using said reference point thus calculated by comparing said calculated reference point of said projected region with a predetermined reference mark corresponding to the proper alignment of the particular headlight beam tested.

4. The method of claim 3 wherein said reference point is a center of gravity of said region.

5. The method of claim 3 wherein said reference point is a center point of a rectangle delineating said region, said rectangle definable by calculating an average point of coordinate positions of said region in a horizontal direction and calculating an average point of coordinate positions of said region in a vertical direction.

6. The method of claim 1 further comprising a step of comparing said region with a predetermined reference mark and a step of selecting another area comprising said light segments within a range in which a proportionality relation between log S and I holds and repeating said steps of finding and determining the amount said light segments of said area are to be varied incrementally or decrementally until said periphery of said region is brought into contact with said reference mark.

7. The method of claim 6 where said region and said reference mark are displayed on a display device.

8. The method of claim 1 wherein said light source is a headlight of an automobile.

9. A system for determining a projecting direction of a light beam emitted from a light source, comprising:
   receiving means for receiving and reflecting a light beam emitted from a light source;
   reading means for reading a light pattern of said light beam projected on said receiving means thereby producing analog image data corresponding to the radiant intensity of given light segments, comprising said light pattern;
   setting means for selecting a reference area composed of said light segments;

processing means for processing said image data using a threshold level to calculate an area of light segments from those image data having a radiant intensity level equal to or above said threshold level, said threshold level being capable of being varied and said area of light segments defining a region within said light pattern having a radiant intensity I of a predetermined level; and comparing means for comparing said calculated area of light segments with said reference area said comparing means supplying a signal to said processing means to vary said threshold level until said calculated area is equal to said reference area.

10. The system of claim 9 further comprising displaying means for displaying, a reference mark corresponding to said reference area and said region superimposed on the same screen for determining the projecting direction of said light beam.

11. The system of claim 9 wherein said light source is an automobile headlight which is adjustable in orientation.

12. The system of claim 11 wherein said receiving means includes a projection screen placed opposite to said automobile headlight and spaced apart therefrom.

13. The system of claim 12 wherein said reading means includes a T.V. camera for receiving reflected light from said projection screen.

14. The system of claim 13 wherein said processing means includes a binary conversion unit for receiving said image data in an analog form from said T.V. camera to convert said image data into binary image data and a screen memory for storing said binary image data supplied from said binary conversion unit.

15. The system of claim 14 wherein said reference area set by said setting means is within a range of segments of said light pattern wherein a proportionality relation holds between log S and I, where S is said area of light segments having a radiant intensity equal to or greater than a predetermined intensity, I, said proportionality relation being such that a curve representing the rate of change of radiant intensity with respect to the log of S will be linear irrespective of the light source used, said proportionality relation corresponding to said periphery region of said light beam.

* * * * *